(12) United States Patent
Fife et al.

(10) Patent No.: US 7,456,073 B2
(45) Date of Patent: Nov. 25, 2008

(54) WET ELECTROLYTIC CAPACITORS

(75) Inventors: James A. Fife, Myrtle Beach, SC (US); Gang Ning, Myrtle Beach, SC (US); Brady Jones, Myrtle Beach, SC (US)

(73) Assignee: AVX Corporation, Myrtle Beach, SC (US)

( * ) Notice: Subject to any disclaimer, the term of this patent is extended or adjusted under 35 U.S.C. 154(b) by 264 days.

(21) Appl. No.: 11/510,966

(22) Filed: Aug. 28, 2006

(65) Prior Publication Data

US 2006/0286761 A1    Dec. 21, 2006

Related U.S. Application Data

(62) Division of application No. 11/136,070, filed on May 24, 2005, now Pat. No. 7,099,143.

(51) Int. Cl.
*H01L 21/20* (2006.01)
*H01G 9/00* (2006.01)
*H01G 9/145* (2006.01)

(52) U.S. Cl. .................. 438/381; 29/25.03; 361/516

(58) Field of Classification Search ............... 438/381; 29/25.03; 361/516
See application file for complete search history.

(56) References Cited

U.S. PATENT DOCUMENTS

| | | | |
|---|---|---|---|
| 3,082,360 A | 3/1963 | Robinson et al. | |
| 3,647,420 A | 3/1972 | Restelli | |
| 3,958,044 A | 5/1976 | Yamaguchi et al. | |
| 3,962,715 A | 6/1976 | Raccah et al. | |
| 4,084,965 A | 4/1978 | Fry | |
| 4,085,435 A | 4/1978 | Galvagni | |
| 4,118,727 A | 10/1978 | LaPlante | |
| 4,155,017 A | 5/1979 | Gaule et al. | |
| 4,201,798 A | 5/1980 | Lindmayer | |
| 4,412,902 A | 11/1983 | Michikami et al. | |
| 4,466,841 A | 8/1984 | Walters | |
| 4,523,255 A | 6/1985 | Rogers | |
| 4,672,267 A | 6/1987 | Lapatovich et al. | |
| 4,712,857 A | 12/1987 | Lee | |
| 4,722,756 A | 2/1988 | Hard | |
| 4,892,862 A | 1/1990 | Ogushi et al. | |
| 4,945,452 A | 7/1990 | Sturmer et al. | |
| 4,992,910 A | 2/1991 | Evans | |

(Continued)

FOREIGN PATENT DOCUMENTS

CA            2018346         12/1990

(Continued)

OTHER PUBLICATIONS

Bauer, The Oxides of Niobium, Zeitschrift fuer anorganische und allgemeine Chemie, vol. 248, No. 1, 1941.

(Continued)

*Primary Examiner*—Ha Nguyen
*Assistant Examiner*—Valerie Brown
(74) *Attorney, Agent, or Firm*—Dority & Manning, P.A.

(57) ABSTRACT

A wet electrolytic capacitor that includes an anode, cathode, and a liquid electrolyte disposed therebetween is provided. The cathode contains a metal oxide coating, such as $NbO_2$, in conjunction with other optional coatings to impart improved properties to the capacitor.

20 Claims, 7 Drawing Sheets

U.S. PATENT DOCUMENTS

| | | | |
|---|---|---|---|
| 5,011,999 | A | 4/1991 | Bowman et al. |
| 5,043,849 | A | 8/1991 | Libby |
| 5,098,485 | A | 3/1992 | Evans |
| 5,126,156 | A | 6/1992 | Jones |
| 5,198,187 | A | 3/1993 | Lu et al. |
| 5,198,968 | A | 3/1993 | Galvagni |
| 5,304,330 | A | 4/1994 | Tatarchuk et al. |
| 5,306,479 | A | 4/1994 | Sommers |
| 5,357,399 | A | 10/1994 | Salisbury |
| 5,369,547 | A | 11/1994 | Evans |
| 5,394,295 | A | 2/1995 | Galvagni et al. |
| 5,400,211 | A | 3/1995 | Evans |
| 5,419,824 | A | 5/1995 | Weres et al. |
| 5,419,977 | A | 5/1995 | Weiss et al. |
| 5,448,447 | A | 9/1995 | Chang |
| 5,455,999 | A | 10/1995 | Weiss et al. |
| 5,457,862 | A | 10/1995 | Sakata et al. |
| 5,469,325 | A | 11/1995 | Evans |
| 5,473,503 | A | 12/1995 | Sakata et al. |
| 5,495,386 | A | 2/1996 | Kulkarni |
| 5,496,532 | A | 3/1996 | Monzen et al. |
| 5,559,667 | A | 9/1996 | Evans |
| 5,729,428 | A | 3/1998 | Sakata et al. |
| 5,737,181 | A | 4/1998 | Evans |
| 5,754,394 | A | 5/1998 | Evans et al. |
| 5,812,367 | A | 9/1998 | Kudoh et al. |
| 5,982,609 | A | 11/1999 | Evans |
| 5,993,513 | A | 11/1999 | Fife |
| 6,051,044 | A | 4/2000 | Fife |
| 6,094,339 | A | 7/2000 | Evans |
| 6,128,179 | A | 10/2000 | Morokuma |
| 6,165,623 | A | 12/2000 | Fife et al. |
| 6,197,252 | B1 | 3/2001 | Bishop et al. |
| 6,208,502 | B1 | 3/2001 | Hudis et al. |
| 6,224,985 | B1 | 5/2001 | Shah et al. |
| 6,310,765 | B1 | 10/2001 | Tanahashi et al. |
| 6,312,642 | B1 | 11/2001 | Fife |
| 6,322,912 | B1 | 11/2001 | Fife |
| 6,338,816 | B1 | 1/2002 | Fife |
| 6,373,685 | B1 | 4/2002 | Kimmel et al. |
| 6,375,704 | B1 | 4/2002 | Habecker et al. |
| 6,391,275 | B1 | 5/2002 | Fife |
| 6,402,066 | B1 | 6/2002 | Habecker et al. |
| 6,413,282 | B1 | 7/2002 | Tanahashi et al. |
| 6,416,730 | B1 | 7/2002 | Fife |
| 6,420,043 | B1 | 7/2002 | Fife et al. |
| 6,455,108 | B1 | 9/2002 | Muffoletto et al. |
| 6,462,934 | B2 | 10/2002 | Kimmel et al. |
| 6,468,605 | B2 | 10/2002 | Shah et al. |
| 6,510,042 | B1 | 1/2003 | Lee et al. |
| 6,517,645 | B2 | 2/2003 | Fife |
| 6,527,937 | B2 | 3/2003 | Fife |
| 6,563,645 | B2 | 5/2003 | Heemstra et al. |
| 6,563,695 | B1 | 5/2003 | Suzuki et al. |
| 6,576,099 | B2 | 6/2003 | Kimmel et al. |
| 6,592,740 | B2 | 7/2003 | Fife |
| 6,594,140 | B1 | 7/2003 | Evans et al. |
| 6,616,728 | B2 | 9/2003 | Fife |
| 6,639,787 | B2 | 10/2003 | Kimmel et al. |
| 6,687,116 | B2 | 2/2004 | Hudis |
| 6,687,117 | B2 | 2/2004 | Liu et al. |
| 6,702,869 | B2 | 3/2004 | Habecker et al. |
| 6,706,240 | B2 | 3/2004 | Habecker et al. |
| 6,721,170 | B1 | 4/2004 | Evans et al. |
| 6,759,026 | B2 | 7/2004 | Kimmel et al. |
| 6,842,328 | B2 | 1/2005 | Schott et al. |
| 6,885,545 | B2 | 4/2005 | Michel et al. |
| 7,169,284 | B1 | 1/2007 | Jiang et al. |
| 2002/0028175 | A1 | 3/2002 | Fife |
| 2002/0179753 | A1 | 12/2002 | Habecker et al. |
| 2003/0026756 | A1 | 2/2003 | Kimmel et al. |
| 2004/0219094 | A1 | 11/2004 | Motchenbacher et al. |
| 2004/0240149 | A1 | 12/2004 | Lessner et al. |
| 2005/0034299 | A1 | 2/2005 | Kurihara et al. |
| 2005/0146841 | A1 | 7/2005 | Schott et al. |
| 2005/0150576 | A1 | 7/2005 | Venigalla |
| 2005/0190530 | A1 | 9/2005 | Muffolettto et al. |

FOREIGN PATENT DOCUMENTS

| | | |
|---|---|---|
| EP | 1075884 | 2/2001 |
| EP | 1266386 | 12/2002 |
| EP | 1357086 | 10/2003 |
| GB | 1123015 | 8/1968 |
| JP | 62265119 | 11/1987 |
| WO | WO 9738143 | 10/1997 |
| WO | WO 9819811 | 5/1998 |
| WO | WO 9838660 | 9/1998 |
| WO | WO 9957739 | 11/1999 |
| WO | WO 0015555 | 3/2000 |
| WO | WO 0034299 | 6/2000 |
| WO | WO 0056486 | 9/2000 |
| WO | WO 0069588 | 11/2000 |
| WO | WO 01/26852 A1 | 4/2001 |
| WO | WO 0171738 | 9/2001 |
| WO | WO 02086923 | 10/2002 |
| WO | WO 2005028370 | 3/2005 |
| WO | WO 2006/127663 A3 | 11/2006 |

OTHER PUBLICATIONS

Magneli, et al., "Note on the Crystal Structure of Niobium Dioxide", Acta Chem. Scand. 9, p. 1402, 1955.

Lapitskii, et al., Journal of Inorganic Chemistry, USSR, Vo. II, No. 1, pp. 122-141, 1957.

Schwartz, et al., "Niobium Solid Electrolytic Capacitors," J. Electrochemical Society, 108(8):750-757, 1961.

Beacom, et al., "Mechanism of Addition Agent Reaction in Bright and Leveling Nickel Deposition", Journal of Electrochemical Society, 1961.

Z. anorg. Allg. Chemie, vol. 317, pp. 321-333, 1962.

Mifune, et al., "Niobium Solid Electrolytic Capacitors," National Technical Report 9:147, 1963.

Bowman, et al., "The Crystal Structure of Niobium Monoxide" Los Alamos Scientific Laboratory, University of California, 1966.

Baba, et al., J. Mining and Metallurgical Inst. Of Japan, vol. 82, No. 942, p. 855, 1966.

Feschotte, et al., "Niobium: Physico-Chemical Properties of its Compounds and Alloys" Atomic Energy Review, Special Issue No. 2, International Atomic Energy Agency pp. 57-59, Vienna, 1968.

Jackson, et al., "The Use of Niobium as an Anode Material in Liquid Filled Electrolytic Capacitors," Electrocomponent Science and Technology, 1:27-37, 1974.

Vest et al., "Electrical Conductivity in Ceramics and Glass", Department of the Air Force, Aerospace Research Laboratories Wright-Patterson Air Force Base, Ohio, pp. 375-384, 1974.

Gannon, et al., "The Microstructure of Slightly Substoichiometric $NbO_2$", J. Solid State Chemistry, 20, pp. 331-345, 1976.

J. Electrochemical Society: Review and News, 24(12):408C-409C, 1977.

Palatnik, et al., "Heat Field Stability and Crystallization Peculiarities of Amorphous $Nb_2O_5$, Films" Fizika I Khimiya Obrabotki Materialov, 5:87-94, 1980.

Bord, et al., "Quality of Niobium Oxide Semiconductor Capacitors as a Function of Chemical Composition of the Niobium Powder," No. 1(46):11-15, 1982.

Ivanovskiy, et al., "Method for the Production of Bulk Porous Anodes for Electrolytic Capacitors", 1983.

Krehl, et al., "The Influence of Gas Atmospheres on the First Stage Sintering of High-Purity Niobium Powders," Metallurgical Transactions A, 15A:1111-1116, 1984.

Orlov, et al., "Study of Oxygen Solubility in Niobium," Izvestiya Akademii Nauk SSSR, Metally, 5:202-205, 1985.

Petrucci, et al., "Growth of Thin-Film Niobium and Niobium Oxide Layers by Molecular Beam Expitaxy", J. Appl. Phys. 63(3), pp. 900-909, 1987.

Sumin, "Study of NbO by Neutron Diffraction of Inelastic Scattering of Neutrons", Sov. Phys. Crystallogr., 34(3), 1989.

Japanese Abstract for Publication No. 01-176226, 1989.

Japanese Abstract for Publication No. 02-038501, 1990.

Japanese Abstract for Publication No. 03-023222, 1991.

Levinskiy, et al., "Change in Porous Structure and Leakage Currents of Niobium Capacitor Anodes During Electrolytic Oxidation," Poroshkovaya Metallurgiya, 3:56-59, 1991.

Japanese Abstract for Publication No. 04-070594, 1992.

Kuz'michevea, et al., "Superconductivity in the Ln-Sr-Nb-O System" Zh. Neorg. Khim 38(1), pp. 162-166, 1992.

Eckert, "Niobium Compounds and Alloys," Int. J. Refractory Metals and Hard Materials, 12:335-340, 1993-1994.

Yelyutin, et al., "Material For Anodes of Electrolytic and Oxide Semiconductor Capacitors", 1994.

"Material Safety Data Sheet for NbO", ESPI Metals (1994).

Acrivos, et al., "Dynamic Phenomena in Superconducting Oxides Measured by ESR" Phys. Rev. B: Condens. Matter, 50(18), pp. 12710-12723, 1994.

Acrivos, et al., "Dynamics of Flux Motion Observed by ESR in Superconducting Oxides" Physica C (Amsterdam) 234-40 (pt. 5), pp. 3159-3160, 1994.

Al-Kharafi, et al., "Phosphoric Acid Passivated Niobium and Tantalum EIS-Comparative Study," Electrochimica Acta, 40(16):2623-2626, 1994-1995.

Erarslanoglu, et al., "Oxidative Coupling of Methane Over NbO (p-type) and $Nb_2O_5$ (n-type) Semiconductor Materials", Catalysis Letters, 38, pp. 215-218, 1995-1996.

Encyclopedia of Chemical Technology, vol. 17, 4th Edition, pp. 59 and 65-66, 1996.

An, et al., "High-Capacitance Supercapacitor Using a Nanocomposite Electrode of Single-Walled Carbon Nanotube and Polypyrrole", Journal of the Electrochemical Society, 149 (8) pp. A1058-A1062, 2002.

Ramasamy, et al., "Electrochemical characterization of a polypyrrole/$CO_{0.2}CrO_{102}$ composite as a cathode material for lithium ion batteries", Journal of Power Sources, 124, pp. 197-203, 2003.

Alfa Aesar Product Catalog.

Peabody, "Investigation of Columbium as an Electrolytic Capacitor Anode, Part II," U.S. Army Signal Research and Development Laboratory, DK Task NR. 3A99-15-003-04, pp. 1-11.

"Inorganic and Theoretical Chemistry" vol. IX, pp. 856-857.

Young article, pp. 4-5 of Chapter 2.

WET ELECTROLYTIC CAPACITORS

RELATED APPLICATIONS

The present application is a divisional of U.S. application Ser. No. 11/136,070, which was filed on May 24, 2005 now U.S. Pat. No. 7,099,143.

BACKGROUND OF THE INVENTION

Electrolytic capacitors are increasingly being used in the design of circuits due to their volumetric efficiency, reliability, and process compatibility. Typically, electrolytic capacitors have a larger capacitance per unit volume than certain other types of capacitors, making electrolytic capacitors valuable in relatively high-current and low-frequency electrical circuits. One type of capacitor that has been developed is a wet electrolytic capacitor that includes an anode, a cathode, and a liquid or "wet" electrolyte. Wet electrolytic capacitors tend to offer a good combination of high capacitance with low leakage current and a low dissipation factor. In certain situations, wet electrolytic capacitors may exhibit advantages over electrolytic capacitors in which the electrolyte is a solid. For example, wet electrolytic capacitors may, in certain situations, operate at a higher working voltage than solid electrolytic capacitors. Additionally, by way of example, wet electrolytic capacitors sometimes may be much larger in size than solid electrolytic capacitors, leading to larger capacitances for such large wet electrolytic capacitors.

In conventional wet electrolytic capacitors, the anode may be a metal foil, for example, a tantalum foil. The anode may also be a metal "slug," for example, a "slug" of powdered tantalum material. As is known in the art, the term "slug" may refer to the anode body portion of a capacitor. A tantalum slug may be formed by mixing powdered tantalum particles with a suitable binder/lubricant to ensure that the particles will adhere to each other when pressed to form the anode. The powdered tantalum is compressed under high pressure around a tantalum wire and is sintered at high temperature under vacuum to form a sponge-like structure, which is very strong and dense but also highly porous. The porosity of the resulting tantalum slug results in the slug having a large internal surface area.

In certain wet electrolytic capacitors, the cathode is a container, which is filled with the liquid electrolyte. For example, the cathode may be a tantalum or tantalum-plated cylindrically-shaped container that acts as the negative terminal of the electrolytic capacitor. In these wet electrolytic capacitors, the liquid electrolyte and the porous, sintered anode are disposed within the cathode container. The wet electrolyte electrically connects the anode and the cathode, and thus, must have a certain conductivity. In many typical wet electrolytic capacitors, the liquid electrolyte is an aqueous solution of sulfuric acid.

Some conventional wet electrolytic capacitors are described in U.S. Pat. Nos. 5,369,547 and 6,594,140 to Evans, et al., both of which are incorporated herein in their entireties by reference thereto for all purposes. In the Evans, et al. '547 patent, a metal container having an inside surface and an outside surface functions as the cathode of the capacitor, and a porous coating is disposed at the inside surface of the container in electrical communication with the container. Similarly, in the Evans, et al. '140 patent, the cathode of a wet electrolytic capacitor includes a coating and is described as an electrochemical-type capacitor electrode. Additionally, in U.S. Pat. No. 6,721,170 to Evans, et al., packaged hybrid capacitors are described, and the cathode of such a hybrid capacitor is said to include a porous metal oxide film, preferably a metal oxide cathode layer of ruthenium.

Coatings, such as those described in the Evans, et al. patents mentioned above, may be applied to a metal substrate for use as a cathode in a wet electrolytic capacitor using various techniques, such as the methods described in the '547 and '140 Evans, et al. patents, as well as the substrate coating process disclosed in U.S. Pat. No. 6,224,985 to Shah, et al., which is incorporated herein in its entirety by reference thereto for all purposes.

Despite the development of various wet electrolytic capacitors with coated cathodes having certain improved properties, a need currently exists for improved wet electrolytic capacitors that exhibit increased effective cathode capacitance. Specifically, a need currently exists for wet electrolytic capacitors having an extremely large cathode capacitance, which enables such wet electrolytic capacitors to exhibit improved volumetric efficiency. The wet electrolytic capacitors of the present invention and the cathodes for use in such capacitors address these and other needs.

SUMMARY OF THE INVENTION

In accordance with one embodiment of the present invention, a wet electrolytic capacitor is disclosed that comprises an anode, a cathode, and a liquid electrolyte disposed between the cathode and anode. The cathode contains a metal substrate and an oxide coating overlying the metal substrate. The oxide coating comprises a niobium oxide having an atomic ratio of niobium to oxygen of 1 less than 2.5.

In accordance with another embodiment of the present invention, a method for forming a wet electrolytic capacitor is disclosed. The method comprises anodizing a surface of an anode to form a dielectric film; applying a particle suspension to a metal substrate of a cathode; sintering the suspension to form an oxide coating, the oxide coating comprising a niobium oxide having an atomic ratio of niobium to oxygen of 1 less than 2.5; and disposing a liquid electrolyte between the anode and the cathode.

In accordance with still another embodiment of the present invention, a wet electrolytic capacitor is disclosed that comprises an anode, a cathode, and a liquid electrolyte disposed between the cathode and anode. The cathode contains a metal substrate, metal oxide coating, protective coating, and a conductive polymer coating.

Other features and aspects of the present invention are set forth in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which.

Figure 1A:
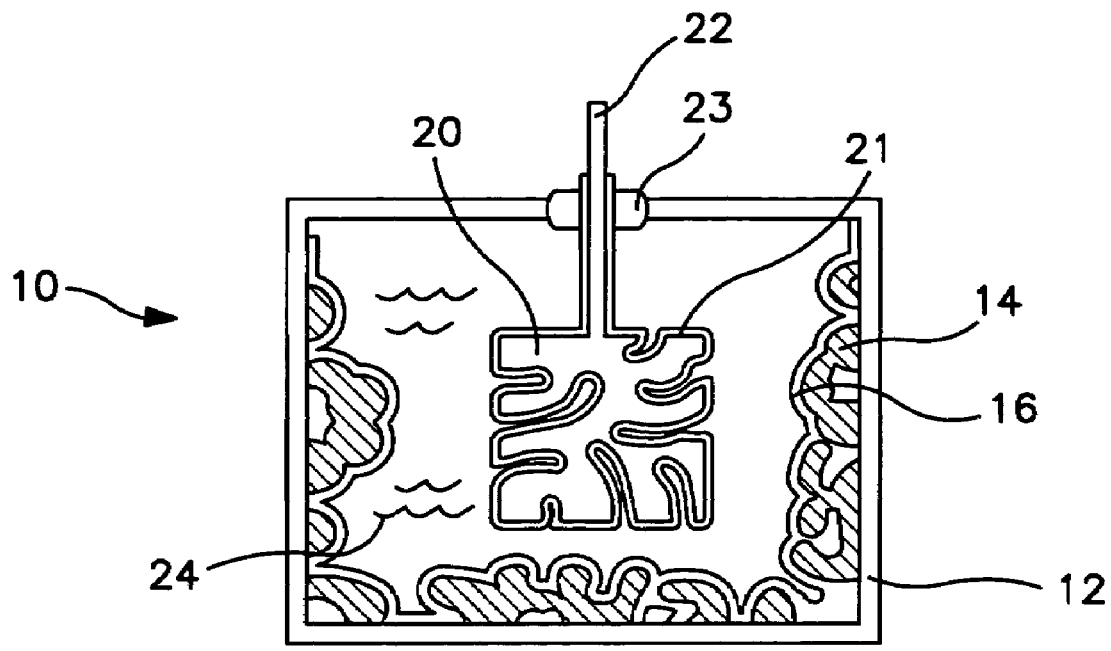
FIG. 1A is a cross-sectional view of one embodiment of a capacitor according to the present invention.

Repeat use of reference characters in the present specification and drawings is intended to represent same or analogous features or elements of the invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention, which broader aspects are embodied in the exemplary construction.

The present invention is generally directed to improved wet electrolytic capacitors that include an anode, cathode, and a liquid electrolyte disposed therebetween. More specifically, the cathode contains a metal oxide coating, such as niobium oxide, in conjunction with other optional coatings to impart improved properties to the capacitor. For example, as a result of the present invention, wet electrolytic capacitors may be formed that exhibit high levels of cathode capacitance when compared to conventional wet electrolytic capacitors. Such high levels of cathode capacitance may lead to wet electrolytic capacitors having improved volumetric efficiency. Additionally, it is believed that wet electrolytic capacitors comprising the cathodes described herein are functional over a wider range of pH values (i.e., in more neutral pH environments) than certain conventional wet electrolytic capacitors. Functioning over a wider range of pH values means that wet electrolytic capacitors containing the cathodes described herein may contain a wider variety of anodes and other components, such as casing components.

Referring to FIG. 1A, for example, one embodiment of a wet electrolytic capacitor 10 formed according to the present invention is shown. The capacitor 10 includes an anode 20. Although not required, the anode 20 is illustrated in this embodiment as a porous "slug" of material suspended within a cathode container 12. Anode 20 may generally be a metal, a metal oxide, a metal nitride, or combination thereof. For example, the anode 20 may include tantalum, aluminum, titanium, niobium, zirconium, hafnium, alloys of these metals, or combinations thereof, as well as oxides and/or nitrides of such metals. For instance, the anode 20 may be formed from a metal oxide or nitride (e.g., niobium monoxide, tantalum oxide, tantalum nitride, niobium nitride, and so forth) that is generally considered a semi-conductive or highly conductive material. Examples of such metal oxides are described in U.S. Pat. No. 6,322,912 to Fife, which is incorporated herein in its entirety by reference thereto for all purposes. Examples of such metal nitrides are likewise described in "Tantalum Nitride: A New Substrate for Solid Electrolytic Capacitors" by T. Tripp; Proceedings of CARTS 2000: 20th Capacitor and Resistor Technology Symposium, 6-20 Mar. 2000.

A variety of conventional fabricating procedures may generally be utilized to form the anode 20 from the selected metal. In one embodiment, a tantalum powder having a certain particle size is first selected. The particle size selected may vary depending on the voltage of the resulting capacitor desired. For example, powders with a relatively large particle size (e.g., about 10 micrometers) are often used to produce high voltage capacitors, while powders with a relatively small particle size (e.g., about 0.5 micrometers) are often used to produce low voltage capacitors.

Once the desired conductive metallic powder is selected, it is then typically mixed with a binder/lubricant to ensure that the particles adequately adhere to each other when pressed to form the anode. For example, in some embodiments, tantalum powder may be mixed with a small quantity (e.g., 5% by weight) of a stearic acid binder/lubricant. In some embodiments, after being mixed with the binder/lubricant, the metallic powder is compressed around a metal wire or rod to form a "slug", which generally refers to the resulting anode element. For example, tantalum powder may be compressed around a tantalum wire to form a tantalum slug. The binder/lubricant is then removed by heating the slug under vacuum at a temperature of about 150° C. for several minutes. Alternatively, the binder/lubricant may also be removed by contacting the slug with an aqueous solution, such as described in U.S. Pat. No. 6,197,252 to Bishop, et al., which is incorporated herein in its entirety by reference thereto for all purposes.

Thereafter, the resulting slug is sintered to form a porous, integral mass. For example, in one embodiment, a slug formed from tantalum may be sintered at a temperature of between about 1500° C. to about 2000° C. under vacuum. In addition to the technique described above, any other technique for forming the anode 20 may also be utilized in accordance with the present invention. For example, other techniques for forming the anode 20 may also be described in U.S. Pat. No. 4,085,435 to Galvagni; U.S. Pat. No. 4,945,452 to Sturmer, et al.; U.S. Pat. No. 5,198,968 to Galvagni; U.S. Pat. No. 5,357,399 to Salisbury; U.S. Pat. No. 5,394,295 to Galvagni, et al.; U.S. Pat. No. 5,495,386 to Kulkarni; and U.S. Pat. No. 6,322,912 to Fife, which are incorporated herein in their entirety by reference thereto for all purposes.

After forming the anode 20, a dielectric film 21 is then formed. In one embodiment, the anode 20 is anodized such that a dielectric film 21 is formed over and within the porous anode 20. Anodization is an electrical chemical process by which the anode metal is oxidized to form a material having a relatively high dielectric constant. For example, a tantalum anode may be anodized to form tantalum pentoxide ($Ta_2O_5$), which has a dielectric constant "k" of about 27. Specifically, the tantalum slug may be dipped into a weak acid solution (e.g., phosphoric acid) at an elevated temperature (e.g., about 85° C.) that is supplied with a controlled amount of voltage and current to form a tantalum pentoxide coating having a certain thickness. The power supply is initially kept at a constant current until the required formation voltage is reached. Thereafter, the power supply is kept at a constant voltage to ensure that the desired dielectric thickness is formed over the tantalum slug's surface. In addition to being formed on the surface of the tantalum slug, a portion of the dielectric film 21 will form on the surfaces of the pores of the metal of anode 20, as shown in FIG. 1A.

The following chemical equations generally describe one anodization process for tantalum:

Anode:

$$2Ta \rightarrow 2Ta^5 + 10e$$

$$2Ta^5 + 10OH^- \rightarrow Ta_2O_5 + 5H_2O$$

Cathode:

$$10H_2O + 10e \rightarrow 5H_2 + 10OH^-$$

However, it should be understood that the dielectric film 21 described above is but one example of a dielectric film that may be used in the present invention. In particular, the dielectric film may be formed from other types of materials and using different techniques ways. For example, if desired, a polymeric dielectric film, such as polyimide films, may be utilized. Examples of such films may be described in U.S. Pat. No. 5,812,367 to Kudoh, et al. The dielectric film also may be formed thermally by exposure to oxygen ($O_2$) or water at elevated temperature.

As shown in FIG. 1A, the anode 20 may contain a portion 22 that is not anodized or is not covered by dielectric film 21. Additionally, a portion of the anode 20 may be surrounded by glass-to-metal seal 23, which connects and seals the anode 20 to cathode container 12. The capacitor 10 may also include a spacer (not shown) that holds the anode 20 steady within the cathode container. The spacer may, for example, be made of plastic and may be washer-shaped.

Also shown in FIG. 1A is a liquid electrolyte 24 disposed between and in contact with the anode 20 and the cathode (described in more detail below). Generally, the liquid electrolyte 24 is the electrically active liquid that provides the connecting path between the anode and cathode. In certain embodiments, an aqueous solution of sulfuric acid, $H_2SO_4$, is used as the electrolyte 24, particularly when the anode comprises tantalum. However, liquid electrolyte 24 may be any number of other conventional electrolytes (such as, for example, an ammonium salt dissolved in glycol or a glycol-like solvent if the anode is aluminum). Liquid electrolyte 24 may also be a neutral electrolyte. Various other liquid electrolytes are described in U.S. Pat. Nos. 5,369,547 and 6,594,140 to Evans, et al., which are incorporated herein their entirety by reference thereto for all purposes.

The capacitor 10 further includes cathode container or cathode substrate 12. In the embodiment of FIG. 1A, cathode container or cathode substrate 12 is a cylindrically-shaped "can" with an attached lid. Cathode container 12 comprises a metal. In general, any of a variety of metals may be utilized for forming the cathode container 12 of the capacitor 10. For instance, cathode container 12 may comprise a valve metal, such as tantalum, niobium, aluminum, hafnium, titanium, alloys of these metals, and so forth. In addition, cathode container 12 may comprise a non-valve metal, such as copper or silver, or combinations of non-valve metals.

The capacitor 10 also contains an oxide coating 14 that overlies the cathode container 12. Although not required, the oxide coating 14 may possess a relatively low resistivity (e.g., relatively conductive) to impart the desired electrical properties to the capacitor 10. For example, the oxide coating 14 may have a resistivity of less than about $1 \times 10^5$ ohm-cm, and in some embodiments, from about $1 \times 10^3$ and about $1 \times 10^4$ ohm-cm. Various oxides may generally be employed in the coating 14. For example, suitable oxides may include a metal selected from the group consisting of niobium, tantalum, aluminum, titanium, ruthenium, and so forth, as well as combinations of these metals. Of course, besides containing a metal and oxygen, the oxide may also include other atoms or elements.

In particular embodiments of the present invention, the oxide coating 14 contains a niobium oxide having an atomic ratio of niobium to oxygen of 1:less than 2.5, more particularly, of 1:less than 1.5, more particularly, of 1:less than 1.1, and even more particularly, of 1:0.5±0.2. For example, the niobium oxide may be $NbO_{0.7}$, $NbO_{1.0}$, $NbO_{1.1}$, and $NbO_2$. In a preferred embodiment, the oxide coating 14 contains $NbO_2$. $NbO_2$ is a relatively conductive niobium oxide that does not anodize under normal conditions. $NbO_2$ is also stable in or does not readily dissolve in $H_2SO_4$ or other liquid electrolytes. Further, $NbO_2$ is chemically stable after sintering at high temperatures. That is, an $NbO_2$-coated cathode may be sintered at high enough temperatures such that the $NbO_2$ bonds well to the cathode substrate (e.g., a tantalum can or a tantalum foil) while maintaining its chemical structure as $NbO_2$. For example, x-ray diffraction testing shows that after sintering at high temperatures, $NbO_2$ retains its chemical structure as $NbO_2$ even though it is securely bonded to a tantalum substrate to form a cathode. $NbO_2$ also typically has a high surface area so that the liquid electrolyte is able to contact the cathode in more places than if a homogeneous coating were employed containing particles having very low surface area. Additionally, it is believed that $NbO_2$-coated cathodes may effectively operate over a wider pH range than conventional cathodes used in wet electrolytic capacitors. By way of example only, it is believed that certain conventional wet electrolytic capacitors, such as those formed using $RuO_2$-containing cathodes, may require a very specific pH range for proper operation. However, cathodes formed that include a coating comprising $NbO_2$ according to certain embodiments of the present invention may be operable over a wider pH range, which allows for use of a wider range of anodes in capacitors formed with these cathodes.

One powdered form of $NbO_2$ that is suitable for use in the present invention is commercially available from Reading Alloys, Inc. of Robesonia, Pa. This powder has a B.E.T. surface area of from about 3 $m^2$/gram and about 7 $m^2$/gram and an average particle size of from about 0.2 µm to about 5 µm. Another suitable form of powdered $NbO_2$ is commercially available from Alfa Aesar, a Johnson Matthey company, Item #89692. Still another suitable form of powdered $NbO_2$ is commercially available from Sigma-Aldrich Chemicals, Product #383163.

Regardless of the materials from which it is formed, a suspension of oxide particles is generally employed to apply the oxide coating 14 to the cathode substrate 12. For example, the suspension may include a niobium oxide having an atomic ratio of niobium to oxygen of 1:less than 2.5. Alternatively, the suspension may also contain an oxide that is reduced to the desired level upon sintering (described in more detail below). For instance, $Nb_2O_5$ may be utilized in the suspension for subsequent reduction to $NbO_2$ during sintering. Although not required, the particles in the suspension typically have a high surface area and small particle size to provide improved properties to the resulting capacitor. For example, the particles may have a B.E.T. surface area of from about 0.5 $m^2$/gram to about 40 $m^2$/gram and/or an average particle size of from about 0.1 µm to about 5 µm, and in some embodiments, from about 0.5 µm to about 2 µm.

The thickness of the oxide coating 14 may have an influence on the capacitance of the resulting cathode. Thus, in some embodiments, the capacitance may be optimized (e.g., maximized) by selectively controlling the thickness of the coating 14 for a given size of the metal substrate 12, a given size of the anode 20, and a given the configuration of the capacitor in which the cathode is to be used. The thickness of coating 14 may also be increased to decrease the voltage drop across the cathode. In the embodiment of FIG. 1A, for example, the oxide coating 14 may have a thickness of less than about 100 µm. By way of example, if small niobium oxide particles having a particle size of about 0.1 µm are used to form coating 14, then one monolayer of niobium oxide particles has a thickness of about 0.1 µm, and one monolayer of niobium oxide particles may be formed at a time on cathode substrate 12. Then, forming less than about 500 monolayers containing these small niobium oxide particles may provide a coating 14 comprising a niobium oxide having a thickness of less than about 50 μm, wherein the configuration of the capacitor and the sizes of the components (e.g., the sizes of the anode and the cathode substrate) dictate the need for a coating 14 having a thickness of less than about 50 μm. Besides thickness, the total weight of the oxide present in coating 14 may also be selectively controlled because each oxide particle possesses a certain capacitance/gram.

The extent to which the oxide coating 14 covers the cathode substrate 12 may also be varied depending on the intended size and configuration of the capacitor 10. For example, in the illustrated embodiment, the oxide coating 14 does not cover the entire inner surface of cathode can substrate 12. By way of example, in certain embodiments, coating 14 may cover between about 25% and about 75% of the inner surface of cathode can substrate 12, and, in some embodiments, may cover about 50% of the inner surface of cathode can substrate 12. In embodiments wherein coating 14 does not cover the entire inner surface of cathode can substrate 12, space remains for a lid, a stopper, or other component(s) to reside against a portion of the inner surface of cathode can substrate 12.

The oxide coating 14 may be formed on the inner surface of cathode substrate 12 by any number of techniques. For example, U.S. Pat. Nos. 5,369,547 and 6,594,140 to Evans. et al. as well as U.S. Pat. No. 6,224,985 to Shah, et al. describe techniques for forming a metal oxide coating on a surface of a cathode to be used in a wet electrolytic capacitor. Techniques, such as heat treating, thermal sintering, sputtering, screen-printing, dipping, electrophoretic coating, electron beam deposition, spraying, roller pressing, brushing, doctor blade casting, and vacuum deposition, may be used to form coating 14.

According to one method of the present invention, the oxide coating 14 is formed by initially dipping the cathode can 12 into a suspension containing oxide particles and one or more solvents. Some suitable solvents may include non-aqueous solvents, such as methanol, ethanol, butanol, isopropanol, as well as various glycols, such as propylene glycol, hexylene glycol, di(ethylene acetate)glycol, and so forth. The solids content of the suspension may generally vary as desired to achieve the desired coating thickness. For example, the solids content of the oxide may range from about 20% to about 80% by weight, more particularly, between about 30% to about 70% by weight, and even more particularly, between about 35% to about 65% by weight. After applying the oxide suspension, it may then be dried to remove the solvent(s). Drying may sometimes occur in an oven at temperatures of from about 50° C. to about 150° C. Upon drying, the oxide coating 14 is then sintered to help strongly adhere it to the cathode substrate 12. Sintering may occur at a temperature of from about 500° C. to about 3000° C., in some embodiments from about 600° C. to about 2000° C., and in some embodiments from about 800° C. to about 1400° C. Besides facilitating the adhesion of the oxide coating 14 to the cathode substrate 12, sintering may also provide other benefits. For example, sintering may cause a chemical change in the coating itself, such as by reducing $Nb_2O_5$ to $NbO_2$. In this manner, the desired oxide coating may be formed in situ.

If desired, the steps of dipping the cathode substrate into the oxide suspension, drying the cathode substrate, and sintering the coated substrate may be repeated until the desired thickness of the oxide coating 14 is formed. In some embodiments, only a relatively thin layer of the coating is formed at a time. Without intending to be limited by theory, it is believed that the oxide particles adhere better to the cathode substrate if the coating is applied through a series of thin layers. Thus, a thin layer of the coating may be added and sintered, and then another thin layer of the coating may be added and then sintered, wherein each thin layer has a thickness of less than about 150 μm, in some embodiments, less than about 100 μm, and in some embodiments, less than about 75 μm.

Referring again to FIG. 1A, the capacitor 10 may also include an optional conductive polymer coating 16 that overlies the oxide coating 14. For instance, suitable conductive polymers that may be utilized in the coating 16 include, but are not limited to, polypyrroles; polythiophenes, such as poly (3,4-ethylenedioxythiophene) (PEDT); polyanilines; poly-acetylenes; poly-p-phenylenes; and derivatives thereof. The coating 16 may also be formed from multiple conductive polymer layers. For example, in one embodiment, coating 16 may contain one layer formed from PEDT and another layer formed from a polypyrrole.

Although not required, the conductive polymer coating 16 may be used in certain embodiments of the present invention to increase the effective capacitance of the capacitor 10. The increase in effective capacitance may be attributable to several aspects of conductive polymers. In particular, when a conductive monomer polymerizes, it typically assumes an amorphous, non-crystalline form, which appears somewhat like a web when viewed under scanning electron microscopy. This means that the resultant conductive polymer coating has high surface area and therefore acts to somewhat increase the effective surface area of the coated substrate to which it is applied. Without intending to be limited by theory, the present inventors believe that the high surface area of the conductive polymer coating may aid in increasing the overall capacitance of capacitors formed according to the present invention because the liquid electrolyte (e.g., an $H_2SO_4$ solution) is actually contacting the cathode in more places than if no conductive polymer was present on the cathode.

Various methods may be utilized to apply the conductive polymer coating 16 to the cathode substrate 12. For instance, techniques such as sputtering, screen-printing, dipping, electrophoretic coating, electron beam deposition, spraying, and vacuum deposition, may be used to form the coating 16. In one embodiment, for example, the monomer(s) used to form the conductive polymer (e.g., PEDT), may initially be mixed with a polymerization catalyst to form a dispersion. For example, one suitable polymerization catalyst is BAYTRON C (Bayer Corp.), which is iron (III) toluene-sulphonate and n-butanol. BAYTRON C is a commercially available catalyst for BAYTRON M, which is 3,4-ethylenedioxythiophene, a PEDT monomer also sold by Bayer Corporation.

Once a dispersion is formed, the oxide-coated cathode substrate may then be dipped into the dispersion so that conductive polymer forms on the surface of the cathode. Alternatively, the catalyst and monomer(s) may also be applied separately to the cathode. In one embodiment, for example, the catalyst may be dissolved in a solvent (e.g., butanol) and then applied to the cathode as a dipping solution. The cathode may then be dried to remove the solvent therefrom. Thereafter, the cathode may be dipped into a solution containing the appropriate monomer. Once the monomer contacts the surface of the cathode containing the catalyst, it chemically polymerizes thereon. Likewise, in other embodiments, the cathode is first dipped into the solution containing the monomer, is dried to remove the solvent therefrom, and is then dipped into the solution containing the catalyst, whereby the conductive polymer chemically polymerizes on the cathode.

The combination of applying the oxide coating 14 and conductive polymer coating 16 to the cathode substrates 12 unexpectedly leads to cathodes having significantly increased cathode capacitance values when compared to conventional cathodes of the same size and used in wet electrolytic capacitors of the same configuration. Much higher cathode capacitance reduces cathode limiting within a wet electrolytic capacitor and allows for using larger anodes, which results in greater volumetric efficiency for a capacitor when compared to a conventional wet electrolytic capacitor of the same size and configuration. Volumetric efficiency is generally the product of capacitance and voltage, divided by the volume of the capacitor, or $\mu F*V/cc$ (or Coulombs/cc).

It should be noted that cathode capacitance values for cathodes formed according to the present invention may vary greatly, since the cathode substrates may be very large or very small because the "loading" of the oxide and conductive polymer coatings 14 and 16, respectively, may vary so widely. Likewise, wet electrolytic capacitors using such cathodes may have widely varying configurations (e.g., varying distances between anode and cathode, varying anode sizes, etc.). However, it is believed that in cathodes formed according to certain embodiments of the present invention (for example, containing a coating 14 comprising $NbO_2$ and a coating 16 comprising PEDT), the $NbO_2$ and PEDT act synergistically to provide significantly increased cathode capacitance to cathodes, when compared to conventional cathodes of the same size and shape without this combination of $NbO_2$ and PEDT-containing coatings. Such synergistic interaction between $NbO_2$ and conductive polymers such as PEDT may mean that each additional gram of PEDT used in forming coating 16 actually provides an unexpectedly high amount of capacitance per gram (pF/g) to the entire cathode.

Although various methods have been described above, it should be understood that any other method for applying the coating comprising the conductive polymer coating 16 to the cathode may also be utilized in the present invention. For example, other methods for applying such a coating comprising one or more conductive polymers may be described in U.S. Pat. No. 5,457,862 to Sakata, et al., U.S. Pat. No. 5,473,503 to Sakata, et al., U.S. Pat. No. 5,729,428 to Sakata, et al., and U.S. Pat. No. 5,812,367 to Kudoh, et al., which are incorporated herein in their entirety by reference thereto for all purposes. Additionally, various amounts of conductive polymer may be present in coating 16. In certain embodiments of the present invention, increasing the thickness of coating 16 or the total weight of conductive polymer present in coating 16 leads to an increase in the capacitance of the resulting cathode.

In yet other particular embodiments of a wet electrolytic capacitor according to the present invention, a protective coating (not shown) may also be formed between the oxide coating 14 and the conductive polymer coating 16. It is believed that the protective coating may improve the mechanical stability of the interface between the conductive polymer coating 16 and the oxide coating 14. Certain polymeric materials useful as the protective coating may include, for instance, natural or synthetic resins that are generally capable of being hardened or cured upon exposure to a curing agent, such as oxygen, heat, and so forth. Some resinous materials that may be utilized in the protective coating include, but are not limited to, polyurethane, polystyrene, combinations thereof, and so forth. Additionally, esters of unsaturated or saturated fatty acids (e.g., glycerides) may be used in the protective coating. Some suitable esters of fatty acids include, but are not limited to, esters of lauric acid, myristic acid, palmitic acid, stearic acid, eleosteraric acid, oleic acid, linoleic acid, linolenic acid, aleuritic acid, shellolic acid, and so forth. These esters of fatty acids have been found particularly useful when used in relatively complex combinations to form a "drying oil", which allows the resulting film to rapidly polymerize into a stable layer. Such drying oils may include mono-, di-, and/or tri-glycerides, which have a glycerol backbone with one, two, and three, respectively, fatty acyl residues that are esterified.

Some suitable drying oils that may be used in the protective coating include, but are not limited to, the following: olive oil (which is believed to contain esters of 84% oleic acid, 7% palmitic acid, 5% linoleic acid, and 2% stearic acid); linseed oil (which is believed to contain esters of 47% linolenic acid, 24% linoleic acid, 19% oleic acid, 6% palmitic acid, and 2% stearic acid); tung oil (which is believed to contain esters of 96% eleosteraric acid and 4% oleic acid); castor oil (which is believed to contain esters of 87% ricinoleic acid, 7% oleic acid, 3% linoleic, 2% palmitic acid, and 1% stearic acid); soybean oil (which is believed to contain 26% oleic acid, 49% linoleic acid, 11% linolenic acid, and 14% of saturated acids); and shellac (which is believed to contain esters of various aliphatic and alicyclic hydroxy acids, such as aleuritic acid and shellolic acid).

When utilized in the protective coating, the esters of fatty acids, such as described above, may exist naturally or be refined from natural materials. For example, soybean oil is often obtained from soybeans through refinement by solvent extraction with petroleum hydrocarbons or using continuous screw press operations. Upon extraction, the obtained soybean oil is primarily constituted of triglycerides of oleic acid, linoleic acid, and linolenic acid. Tung oil, on the other hand, is a drying oil that often requires no such refinement.

In some instances, it may be desired to initiate further esterification of a fatty acid mixture by reacting an alcohol therewith. Such fatty acid/alcohol ester derivatives may generally be obtained using any known alcohol capable of reacting with a fatty acid. For example, in some embodiments, monohydric and/or polyhydric alcohols with less than 8 carbon atoms, and in some embodiments, less than 5 carbon atoms, may be used in the present invention. Specific embodiments of the present invention include the use of methanol, ethanol, butanol, as well as various glycols, such as propylene glycol, hexylene glycol, and so forth. In one particular embodiment, shellac may be esterified by mixing it with an alcohol, such as described above. Specifically, shellac is a resinous excretion of an insect that is believed to contain a complex mixture of fatty acids that, to some extent, are esterified. Thus, when mixed with an alcohol, the fatty acid groups of the shellac are further esterified by reaction with the alcohol.

The protective coating may generally be applied in a variety of different ways. For example, in one embodiment, the cathode substrate may be dipped into a solution of the desired protective coating material(s). The dipping solution may be formed by dissolving the selected protective coating material into a solvent, such as water or a non-aqueous solvent. Some suitable non-aqueous solvents may include, but are not limited to, methanol, ethanol, butanol, as well as various glycols, such as propylene glycol, hexylene glycol, di(ethylene acetate)glycol, and so forth. Particularly desired non-aqueous solvents are those having a boiling point greater than about 80° C., in some embodiments greater than about 120° C., and in some embodiments, greater than about 150° C. As described above, the formation of a dipping solution using a non-aqueous solvent may also lead to further esterification of fatty acids when such resinous materials are utilized.

The cathode substrate may be dipped into the solution one or more times, depending on the desired thickness of the protective coating. For example, in some embodiments, the number of protective layers that form the protective coating may be from about 2 to about 10 layers, and in some embodiments, from about 3 to about 7 layers. Besides dipping, it should also be understood that other conventional application methods, such as sputtering, screen printing, electrophoretic coating, electron beam deposition, vacuum deposition, spraying, and so forth, may also be used to deposit the protective coating.

After forming the protective coating, it is often desired that the cathode be heated or otherwise cured. Heating may facilitate evaporation of any solvent used during application, and may also aid in the esterification and/or polymerization of the resinous materials. The time and temperature at which heating occurs generally varies depending on the specific resinous materials utilized. Typically, each protective layer is dried at a temperature ranging from about 30° C. to about 300° C., and in some embodiments, from about 50° C. to about 150° C., for a time period ranging from about 1 minute to about 60 minutes, and in some embodiments, from about 15 minutes to about 30 minutes. It should also be understood that heating need not be utilized after application of each layer of protective coating, but instead may be utilized only after formation of the entire protective coating.

To facilitate esterification and/or polymerization, one or more "doping" agents may also be added to the protective coating. For instance, one example of a doping agent that may be used is sulfuric acid, which acts as a catalyst in polymerizing the shellac. "Doping" encompasses making the molecules of the coating comprising a conductive polymer and/or the molecules of the protective coating conductive. Such doping may occur during catalysis of polymerization reactions of the protective coating and/or of the coating comprising a conductive polymer. Thus, certain dopants may be found within certain catalysts used in various embodiments of the present invention. Controlling the degree of doping may be beneficial in certain applications of cathodes and capacitors according to the present invention. For example, it is believed that controlling the amount of doping (e.g., controlling the extent to which the molecules in the protective coating and/or the coating comprising a conductive polymer are conductive) may allow for adjusting certain properties of the resulting capacitor, such as optimizing the storage capacity of the capacitor.

In some embodiments of the present invention in which the cathode contains a protective coating, the catalyst (e.g., BAYTRON C, described above) for polymerizing a conductive monomer (e.g., BAYTRON M) might be mixed with the material(s) used to form the protective coating. In such instances, the cathode first may be dipped into a solution containing the catalyst and the protective coating material(s), and the cathode may then be dipped into a solution containing the conductive monomer. As a result, the conductive monomer may contact the catalyst within and/or on the surface of the protective coating and react therewith to form the coating comprising conductive polymer.

Figure 1C:
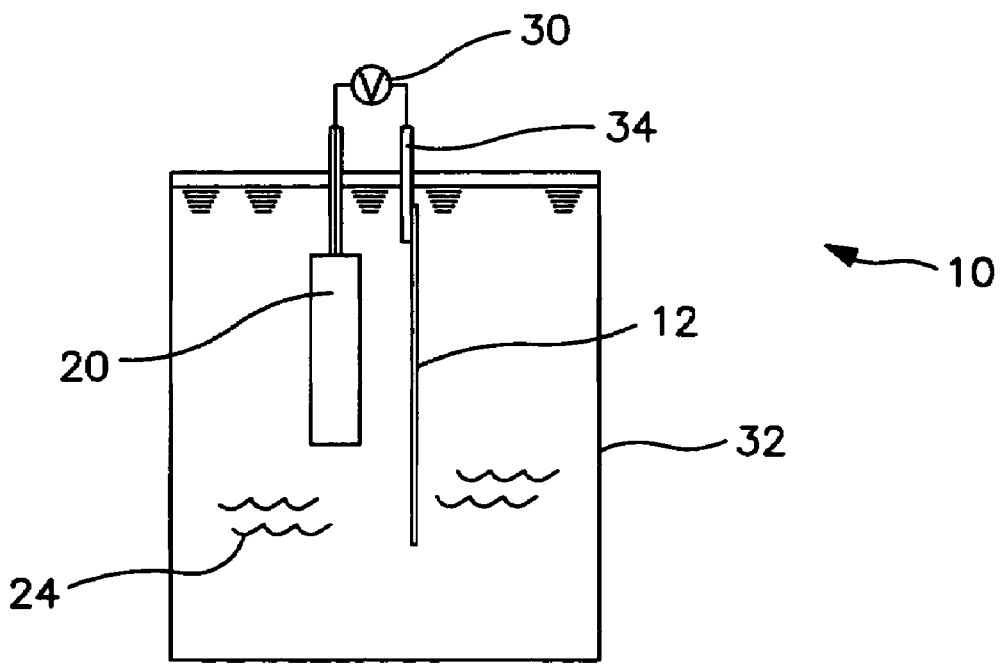
FIG. 1C is a side view of the capacitor of FIG. 1B.
Figure 1B:
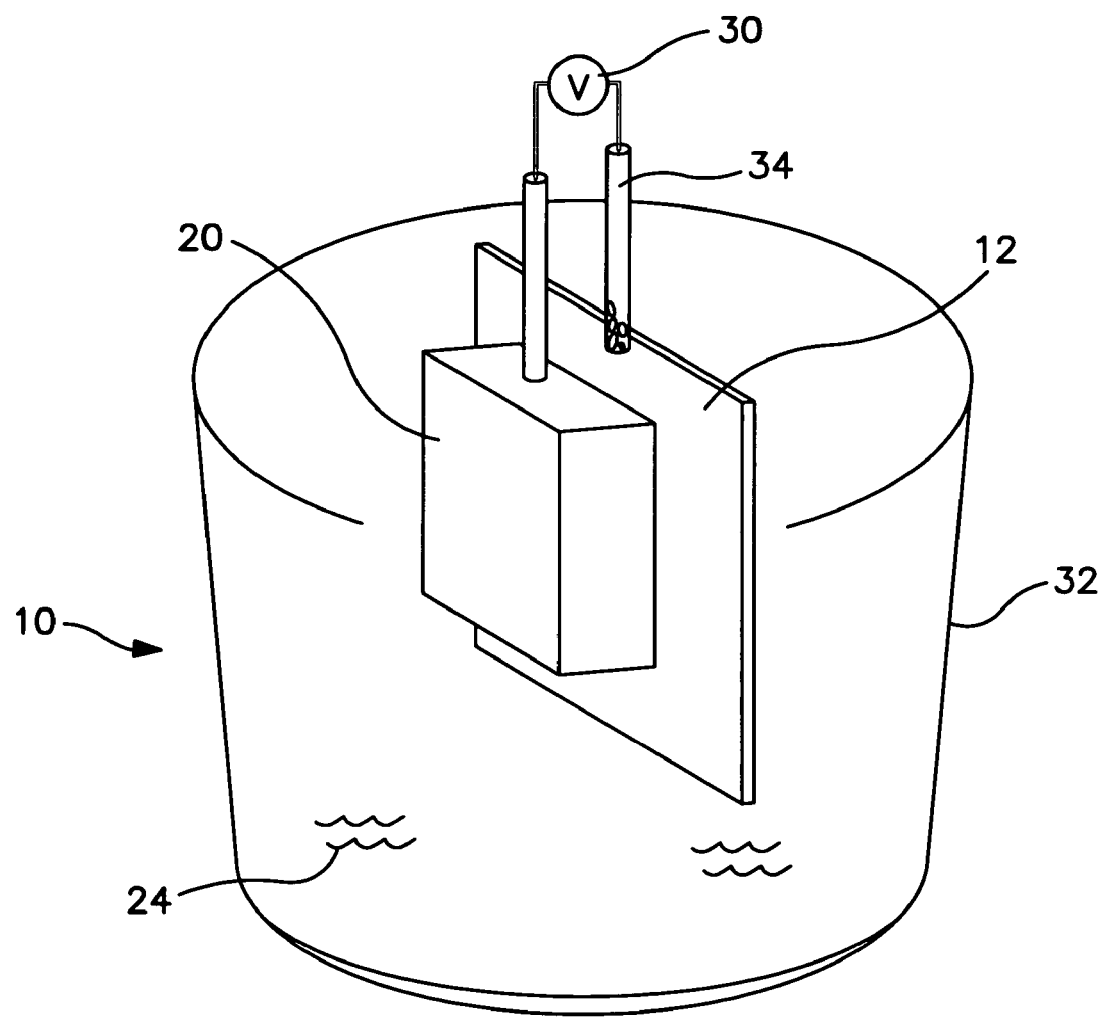
FIG. 1B is a perspective view of another embodiment of a capacitor according to the present invention.

Another embodiment of a wet electrolytic capacitor according to the present invention is shown in FIGS. 1B and 1C. In these Figures, the capacitor 10 includes an anode 20, which, again, may be a porous slug of a metal such as tantalum. However, in this embodiment, the cathode substrate 12 is a rectangular-shaped metal foil or coupon, rather than a cylindrically-shaped container or can as in FIG. 1A. The metal coupon comprises a metal, which, again, may be a valve metal (such as tantalum) or a non-valve metal (such as copper or silver). The cathode in FIGS. 1B and 1C contains an oxide coating 14, as well as the optional conductive polymer coating 16 and protective coating (not shown). In this embodiment, such coatings extend over all sides of the rectangular-shaped metal coupon or foil.

In the embodiment of FIGS. 1B and 1C, anode 20 and the cathode are both attached to a voltage supply 30 and are suspended in a glass beaker 32 so that they do not touch one another. Specifically in FIGS. 1B and 1C, anode 20 and the cathode are separated by a distance of about 1 millimeter, and anode 20 has a dielectric film extending over its surface. The cathode is attached to a metal wire 34, specifically a tantalum wire, via spot welding, and this wire 34 provides electrical continuity up to the voltage supply 30. As shown in FIGS. 1B and 1C, anode 20 may be somewhat smaller than the cathode.

While FIGS. 1A-1C show various configurations a wet electrolytic capacitor of the present invention may embody, capacitors of the present invention may also have a prismatic configuration, which includes two sheet cathodes with an anode between them. In short, any conventional configuration known in the art for wet electrolytic capacitors may be employed using cathodes formed according to the present invention.

As a result of the present invention, a wet electrolytic capacitor may be formed that exhibits excellent electrical properties. For example, a wet electrolytic capacitor formed using a cathode described herein may exhibit a higher level of cathode capacitance when compared to conventional wet electrolytic capacitors of the same general size and configuration. Such high levels of cathode capacitance may lead to wet electrolytic capacitors of the present invention having improved volumetric efficiency. For instance, the volumetric efficiency may be greater than about 10,000 µF*V/cc, in some embodiments, greater than about 20,000 µF*V/cc, and in some embodiments, greater than about 40,000 µF*V/cc. Further, the wet electrolytic capacitors of the present invention may also have a relatively low dissipation factor.

For example, the wet electrolytic capacitors may have a dissipation factor of less than about 50%, in some embodiments, less than about 30%, and in some embodiments, less than about 15%.

The wet electrolytic capacitors of the present invention may be used in various applications, including but not limited to medical applications, such as defibrillators and so forth, as well as military applications, such as RADAR systems and so forth.

The wet electrolytic capacitors of the present invention may also be used in consumer electronics including radios, televisions, and so forth.

The present invention may be better understood by reference to the following examples.

EXAMPLES

In the following Examples, capacitors were formed according to several embodiments of the present invention. The capacitance and dissipation factor of the capacitors were measured using an Agilent 4284A Precision LCR meter with Agilent 16089B Kelvin Leads with 2 volts bias and 1 volt signal at 120 Hertz.

In some of the Examples below, tantalum cans were used to form cathodes according to the present invention. In these particular Examples, tantalum cans having a diameter of 9.89 mm and a height of 26.32 mm were used. The cathodes were produced by first placing a tantalum can in a beaker and adding enough isopropanol (IPA) to cover the tantalum can. The beaker was placed under a fume hood and allowed to stand for 5 minutes. Subsequently, the IPA was decanted from the tantalum can, and the can was allowed to air-dry until no evidence of IPA remained. The tantalum can was then placed in a drying oven at 85° C. for 15 minutes.

Next, to form a suspension of $NbO_2$, about 9.0 grams of $NbO_2$ powder was weighed into a 20 mL plastic jar, and 8 mL of IPA was poured into the plastic jar with the $NbO_2$ powder. The $NbO_2$ powder used in these Examples is commercially available from Reading Alloys, Inc. in Robesonia, Pa. and has a very high surface area. For example, the BET surface area of several samples of this $NbO_2$ powder was measured and found to be between about 3.4 $m^2$/gram and about 6.7 $m^2$/gram. Additionally, the $NbO_2$ particles in these powder samples had a particle size of between about 0.75 μm to about 2 μm.

A lid was placed loosely on the plastic jar to prevent the material from escaping from the jar while preventing pressure from building up inside the jar. The jar was placed in a 100 mL beaker, which was filled with water to the 40 mL mark. The beaker was then suspended in an ultrasonic bath and was ultrasonicated for 30 minutes. The beaker was removed from the ultrasonic bath, and the plastic jar was removed from the beaker. If the suspension appeared too thick, more IPA was added and the ultrasonication step was repeated. If the suspension appeared too thin, the lid was left off the jar so that some of the IPA evaporated.

Once the $NbO_2$ suspension was made, a disposable pipette was used to completely fill a tantalum can. Specifically, the can was held horizontally and was manually rotated slowly so that the walls of the can were evenly coated with the $NbO_2$ suspension. The can was then placed upright and allowed to dry in ambient conditions until the coating appeared dry. The can was then placed in a drying oven at 80° C. for 15 minutes. The can with one coating of $NbO_2$ was then vacuum sintered for 10 minutes. The typical temperature for this vacuum sintering was 1150° C.; however, in some of the Examples below, various sintering temperatures were used to determine what effect the sintering temperature may have on the electrical properties of the cathodes. The process of applying an additional coating of $NbO_2$ to the can, drying the can, and vacuum sintering the can at high temperature was repeated until the desired number of $NbO_2$ coats was applied.

Additionally, in some of the Examples below, tantalum foil units commonly called "coupons" were used to form cathodes according to the present invention, rather than tantalum cans. In Examples where tantalum coupons were used to form $NbO_2$-coated cathodes, the procedure for coating is the same as outlined in detail above, except that when applying the $NbO_2$ suspension to the tantalum coupons, the suspension is applied by dropping 3 or 4 drops of the suspension onto the coupon and then tilting the coupon in all directions so that the suspension spreads evenly over one planar surface of the coupon. The coated coupon is allowed to dry so that the coated surface is up and is parallel to the floor and the other surface may be coated as well.

Further, in another of the Examples below, copper foils or coupons were used to form cathodes according to the present invention. In this Example, copper foils were coated with $NbO_2$ and PEDT, and the $NbO_2$ was adhered to the copper metal by a binder.

Example 1

In this Example, experiments were performed to determine the effectiveness of $NbO_2$ in increasing the capacitance of a cathode and producing a wet electrolytic capacitor having improved volumetric efficiency. Experiments were also performed to determine the proper sintering temperature for forming the $NbO_2$ coated cathodes.

Three 1 $cm^2$ tantalum foil units or coupons were anodized to 25 Volts to act as the anode part of a capacitor. In addition, un-anodized 1 $cm^2$ tantalum foil coupons were coated with $NbO_2$, on both sides, to act as the cathode part of a capacitor. The $NbO_2$ coating procedure is outlined in detail above.

Specifically, three different $NbO_2$ coating thicknesses were examined in this Example. Five tantalum coupons were coated with each of the three $NbO_2$ coating thicknesses so that five different sintering temperatures could be examined. The physical dimensions and coating thicknesses of the cathode parts formed in this Example are listed below in Table I:

TABLE I

| Cathode | Length (mm) | Width (mm) | Height (mm) | Weight (grams) | $NbO_2$ Thickness (μm) |
|---|---|---|---|---|---|
| Standard Tantalum Slug (Control) | 34.7 | 11.2 | 6.5 | 16.72 | N/A |
| Tantalum Foil (Control) | 10.5 | 10.0 | 0.137 | N/A | N/A |
| $NbO_2$-Coated Tantalum Foil (1) (Invention) | 9.7 | 10.2 | 0.147 | N/A | 10 |
| $NbO_2$-Coated Tantalum Foil (2) (Invention) | 10.5 | 10.5 | 0.152 | N/A | 15 |
| $NbO_2$-Coated Tantalum Foil (3) (Invention) | 10.4 | 10.7 | 0.160 | N/A | 23 |

A micrometer was used to measure the thicknesses of the untreated foils and the thicknesses of the $NbO_2$-coated foils to determine the total thickness of the $NbO_2$ coatings on both sides of the treated foils.

Capacitors were formed using each of the three $NbO_2$-coated tantalum foils as the cathodes and an anodized tantalum foil as the anode, wherein five different sintering temperatures had been used to vacuum sinter the $NbO_2$-coated tantalum foils for 10 minutes each. The capacitors were then tested for their capacitance and dissipation factor. Specifically, the Agilent 4284A Precision LCR meter with Agilent 16089B Kelvin leads with 2 volts bias and 1 volt signal at 120 Hertz was used for such testing.

In order to obtain the electrical data, each capacitor was tested in a beaker of 18% $H_2SO_4$ (the liquid electrolyte) in which the anode and cathode foils were mounted parallel to each other with an anode-to-cathode distance of about 1.0 mm.

Table II shows the effective capacitance values and the dissipation factor values for these capacitors, which have varying $NbO_2$ coating thicknesses and were sintered at varying sintering temperatures:

TABLE II

| Cathode (Invention) | Sintering Temperature (° C.) | Capacitance (μF) | Dissipation Factor (%) |
|---|---|---|---|
| $NbO_2$ (1) | 1000 | 0.873 | 0.72 |
| $NbO_2$ (2) | 1000 | 0.887 | 0.76 |
| $NbO_2$ (3) | 1000 | 0.921 | 0.84 |
| $NbO_2$ (1) | 1050 | 0.868 | 0.78 |
| $NbO_2$ (2) | 1050 | 0.900 | 0.68 |
| $NbO_2$ (3) | 1050 | 0.924 | 0.85 |
| $NbO_2$ (1) | 1100 | 0.876 | 0.69 |
| $NbO_2$ (2) | 1100 | 0.905 | 0.66 |
| $NbO_2$ (3) | 1100 | 0.929 | 0.85 |
| $NbO_2$ (1) | 1150 | 0.875 | 0.67 |
| $NbO_2$ (2) | 1150 | 0.906 | 0.65 |
| $NbO_2$ (3) | 1150 | 0.927 | 0.85 |
| $NbO_2$ (1) | 1200 | 0.876 | 0.68 |
| $NbO_2$ (2) | 1200 | 0.907 | 0.64 |
| $NbO_2$ (3) | 1200 | 0.928 | 0.84 |

For comparison, a capacitor was formed using the standard tantalum slug listed in Table I as the cathode and an anodized tantalum foil as the anode. Effective capacitance and dissipation factor values for this capacitor were obtained, and this electrical testing took place in a wet tester. The data is shown in Table III below:

TABLE III

| Standard Tantalum Slug Cathode (Control) | Capacitance (µF) | Dissipation Factor (%) |
|---|---|---|
| 1 | 0.872 | 1.20 |
| 2 | 0.902 | 1.15 |
| 3 | 0.923 | 1.31 |

Again, for comparison, a capacitor was formed using the tantalum foil without $NbO_2$ coating listed in Table I as the cathode and an anodized tantalum foil as the anode. Effective capacitance and dissipation factor values for this capacitor were obtained using the same procedure for obtaining the data recited in Table II above. The results of this testing are shown in Table IV below:

TABLE IV

| Tantalum Foil Cathode (Control) | Capacitance (µF) | Dissipation Factor (%) |
|---|---|---|
| 1 | 0.851 | 0.89 |
| 2 | 0.876 | 0.88 |
| 3 | 0.893 | 1.09 |

The results reported in Tables II, III, and IV above show that capacitors formed according to an embodiment of the present invention, e.g., capacitors formed with cathodes that included $NbO_2$ coated thereon and sintered, exhibit high capacitance values and low dissipation factor values when compared to control capacitors. For instance, the capacitors containing the three $NbO_2$-coated cathodes that underwent sintering at 1200° C. exhibited higher capacitance values and lower dissipation factor values when compared to both the capacitors formed using a tantalum foil cathode without a coating of $NbO_2$ and the capacitors formed using a standard tantalum slug cathode without a coating of $NbO_2$.

Example 2

In this Example, several capacitors were formed using a Y100 tantalum anode (a nominal 100 µF tantalum anode) rather than the anodized foils used in Example 1 above. A first "control" capacitor was formed using a Y100 tantalum anode and the standard tantalum slug cathode described in Example 1 above. A second "control" capacitor was formed using a Y100 tantalum anode and the tantalum foil without any $NbO_2$ coating described in Example 1 above. A capacitor according to the present invention was also formed using a Y100 tantalum anode and an $NbO_2$-coated tantalum foil as the cathode. Specifically, the $NbO_2$-coated tantalum foil used as the cathode in this capacitor was one from Group (3) of Example 1 (e.g., the cathode contained a coating comprising $NbO_2$ having a total thickness of 23 µm) that was vacuum sintered at 1200° C. Effective capacitance and dissipation factor values for these three capacitors were obtained using the same procedure for obtaining the data recited in Table IV above, and the results are shown in Table V below:

TABLE V

| Capacitor Description | Capacitance (µF) | Dissipation Factor (%) |
|---|---|---|
| Y100 Ta Anode, Standard Tantalum Slug Cathode (Control) | 105.6 | 14.82 |
| Y100 Ta Anode, Tantalum Foil Cathode (Control) | 23.3 | 12.50 |
| Y100 Ta Anode, $NbO_2$-Coated Tantalum Foil Cathode (Invention) | 106.7 | 10.70 |

The results reported in Table V above show the tantalum foil to be a relatively poor cathode, while the $NbO_2$-coated tantalum foil cathode led to a greater measured capacitance for the entire cell and a lower dissipation factor for the entire cell compared to the standard cell.

Example 3

In this Example, several capacitors were formed according to the present invention and were tested for their capacitance. Specifically, the cathodes in this Example were formed using tantalum coupons or foils as the metal substrate, and a coating of $NbO_2$ was applied to each tantalum coupon or foil, followed by a coating comprising PEDT conductive polymer.

The procedure for coating the tantalum coupons with $NbO_2$ is described in detail above, and in this Example, the amount of $NbO_2$ used to coat the tantalum coupons was varied to determine the effects on capacitance. Thus, the $NbO_2$-coated tantalum foil cathodes in Cathode Set 1 included 0.0056 grams of $NbO_2$ coated on the tantalum metal; the cathodes in Cathode Set 2 included 0.0113 grams of $NbO_2$ coated on the tantalum metal; and the cathodes in Cathode Set 3 included 0.014 grams of $NbO_2$ coated on the tantalum metal.

Additionally, in this Example, several different amounts of PEDT were used to form conductive polymer coatings on the $NbO_2$-coated cathodes, and these amounts ranged from 0 grams of PEDT to less than about 0.0018 grams of PEDT. In applying the coatings comprising PEDT to the $NbO_2$-coated cathodes, the cathodes were dipped into a catalyst solution containing BAYTRON C, dried, dipped into a monomer solution containing BAYTRON M, and subsequently dried. Once the cathodes were formed, capacitors were assembled using a standard anode, and the capacitance of each capacitor was measured, in µF, and recorded.

Figure 2:
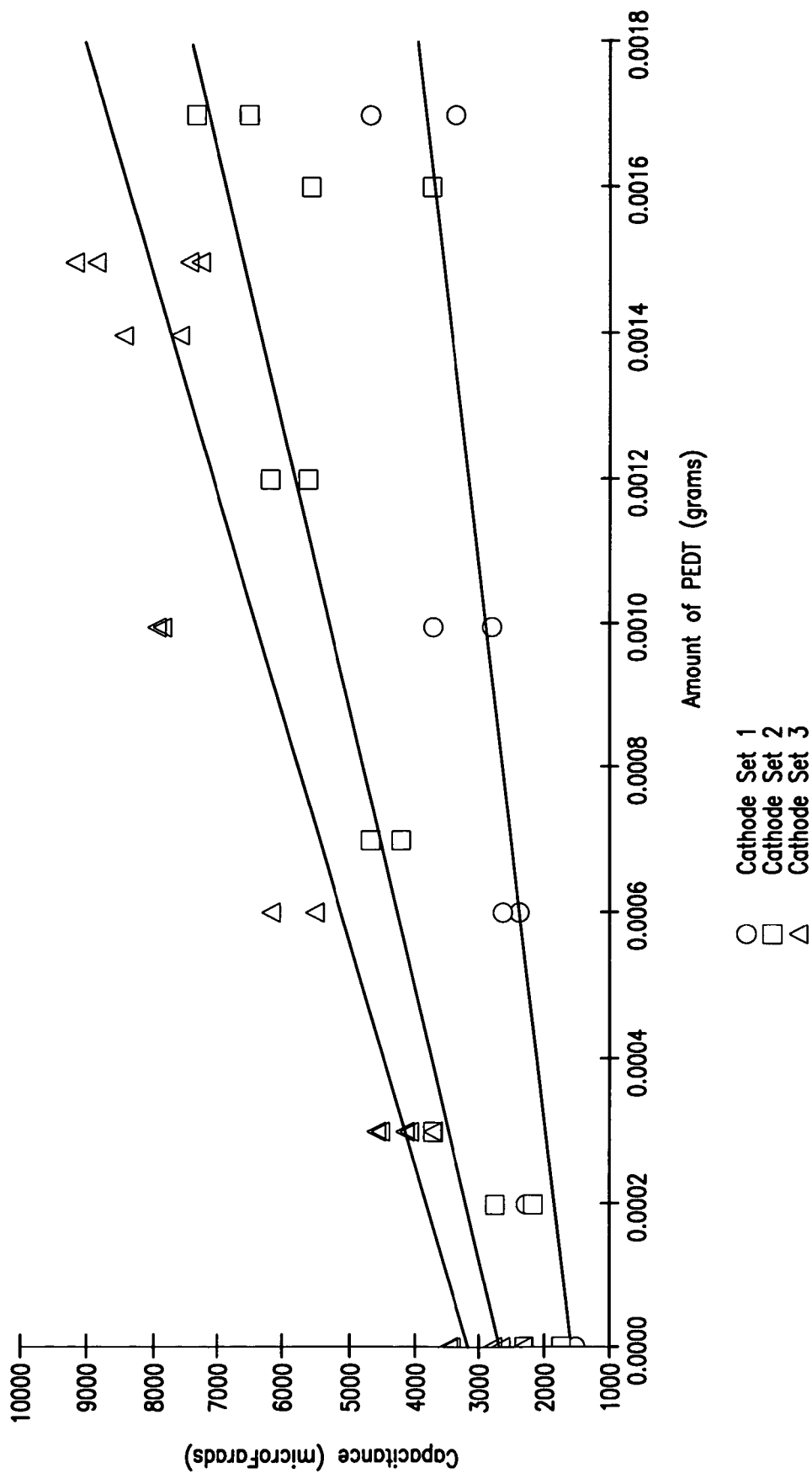
FIG. 2 is a graphical plot of cathode capacitance (in µF) versus the amount of conductive polymer (in grams) for cathodes according to one embodiment of the present invention.

FIG. 2 includes a graph of the results of this Example. Specifically, the graph in FIG. 2 shows how both the amount of PEDT (in grams) coated onto the cathode and the amount of $NbO_2$ (in grams) coated onto the cathode affect the capacitance (in µF) of each capacitor formed using the various cathodes. Particularly, FIG. 2 plots the capacitance of each capacitor versus grams of PEDT coated on top of the $NbO_2$ layer of the cathode. Generally, as shown from the upward slope of all three best-fit curves in FIG. 2, as the amount of PEDT applied to the cathode increases, at a given amount of $NbO_2$, capacitance increases.

The three curves in FIG. 2 represent the three progressively thicker layers of $NbO_2$ (Cathode Sets 1, 2, and 3, respectively). FIG. 2 demonstrates that the slope of cell capacitance (in µF) versus the amount of the PEDT coating (in grams) is greater with larger amounts of $NbO_2$ (e.g., the slope of the curve connecting the data points for Cathode Set 3 is greater than the slope of the curve connecting the data points for Cathode Set 1).

Example 4

In this Example, capacitors were formed according to the present invention using (1) $NbO_2$-coated cathodes as well as (2) $NbO_2$/PEDT-coated cathodes in conjunction with a variety of tantalum anodes.

First, six tantalum cans were coated with $NbO_2$. The procedure used for coating the tantalum cans with $NbO_2$ is described in detail above. Capacitors were then formed using each of these six $NbO_2$-coated tantalum cans as the cathode and a standard anode. The capacitance and dissipation factor values for these capacitors were measured and were recorded in Table VI below:

TABLE VI

| Can # (NbO$_2$-Coated) | Capacitance (µF) | Dissipation Factor (%) |
| --- | --- | --- |
| 2 | 376 | 23.9 |
| 3 | 375 | 26.4 |
| 4 | 370 | 26.2 |
| 5 | 376 | 24.4 |
| 6 | 380 | 25.1 |
| 7 | 381 | 24.5 |
| Average Capacitance | 376 | |

Next, a specific anode was formed, and four 70,000 µF*V/g tantalum pellets were welded onto a strip such that all four pellets could hang in the cathode can without touching each other and without touching the can. The strip of tantalum pellets was then increasingly anodized at formation voltages of 12 Volts, 18 Volts, 27 Volts, and 35 Volts. After anodization at each of the four formation voltages, the anode strip was placed in each of the $NbO_2$-coated cathode cans, and cell capacitance was tested. In these experiments, an 18% solution of $H_2SO_4$ was used as the liquid electrolyte. The results of these tests are recorded in Table VII below:

TABLE VII

| Can # | C After Form. at 12 Volts (µF) | C After Form. at 18 Volts (µF) | C After Form. at 27 Volts (µF) | C After Form. at 35 Volts (µF) |
| --- | --- | --- | --- | --- |
| 3 | 1665 | 1222 | 876 | 670 |
| 4 | 1575 | 1185 | 860 | 660 |
| 5 | 1536 | 1201 | 880 | 672 |
| 6 | 1663 | 1240 | 897 | 680 |
| 7 | 1670 | 1244 | 899 | 687 |
| Avg. | 1622 | 1218 | 882 | 674 |

The exact same procedures outlined above for Cans 2-7 were repeated for several additional tantalum cathode cans. However, in these experiments, each tantalum can was first coated with $NbO_2$ and then coated with conductive polymer, specifically PEDT. The procedure used for coating the tantalum cans with $NbO_2$ is described in detail above, and the procedure used for coating the $NbO_2$-coated cans with PEDT generally involved dipping the $NbO_2$-coated cans into a catalyst solution containing BAYTRON C, drying, dipping into a monomer solution containing BAYTRON M, and subsequently drying. Capacitors were then formed using each of these $NbO_2$/PEDT-coated tantalum cans as the cathode and a standard anode. The capacitance and dissipation factor values for these capacitors were measured and were recorded in Table VIII below:

TABLE VIII

| Can # (NbO$_2$/PEDT-Coated) | Capacitance (µF) | Dissipation Factor (%) |
| --- | --- | --- |
| 8 | 423 | 25.6 |
| 9 | 424 | 24.4 |
| 10 | 426 | 24.1 |
| 11 | 424 | 25.7 |
| 12 | 425 | 25.2 |
| 13 | 426 | 24.9 |
| 14 | 427 | 24.2 |
| Average Capacitance | 425 | |

Again, in forming a specific anode, four 70,000 µF*V/g tantalum pellets were welded onto a strip such that all four pellets could hang in the cathode can without touching each other and without touching the can. The strip of tantalum pellets was then increasingly anodized at formation voltages of 12 Volts, 18 Volts, 27 Volts, and 35 Volts. After anodization at each of the four formation voltages, the anode strip was placed in each of the $NbO_2$/PEDT-coated cathode cans, and cell capacitance was tested. In these experiments, an 18% solution of $H_2SO_4$ was used as the liquid electrolyte. The results of these tests are recorded in Table IX below:

TABLE IX

| Can # | C After Form. at 12 Volts (µF) | C After Form. at 18 Volts (µF) | C After Form. at 27 Volts (µF) | C After Form. at 35 Volts (µF) |
| --- | --- | --- | --- | --- |
| 9 | 2396 | 1626 | 1087 | 794 |
| 10 | 2411 | 1640 | 1090 | 796 |
| 11 | 2326 | 1593 | 1076 | 791 |
| 12 | 2417 | 1637 | 1091 | 798 |
| 13 | 2388 | 1620 | 1084 | 795 |
| 14 | 2440 | 1646 | 1094 | 797 |
| Avg. | 2396 | 1627 | 1087 | 795 |

In order to illustrate how large the capacitance values are for the inventive capacitors of this Example, the anodes used in the experiments just above were also placed in a standard wet test cell for capacitance testing after being anodized to each of four different formation voltages. The electrolyte in the standard wet test cell was also an 18% solution of $H_2SO_4$. As is known in the art, a standard wet test cell comprises a cathode whose capacitance is so large compared to the anode's capacitance that the capacitance of the overall cell is equal to the anode's capacitance, using the equation $1/C_{cell} = 1/C_{anode} + 1/C_{cathode}$. The results obtained from capacitance testing the anodes in the standard wet test cell are provided in Table X below:

TABLE X

| | Formation Voltage | | | |
| --- | --- | --- | --- | --- |
| | 12 Volts | 18 Volts | 27 Volts | 35 Volts |
| Capacitance Measured in Standard Wet Test Cell After Formation at Given Voltage (µF) | 2291 | 1521 | 981 | 740 |

The average measured capacitance values (see Tables VII and IX above) for the two sets of capacitors formed according to the present invention (capacitors including an $NbO_2$-coated cathode and capacitors including an $NbO_2$/PEDT-coated cathode) were compared to the measured capacitance values (see Table X above) for the standard wet test cell capacitor, and the results of this comparison are shown in Table X1 below:

TABLE XI

| Formation Voltage | Avg. Cap of Cells Including NbO$_2$-Coated Cathodes (μF) (Invention) | Avg. Cap of Cells Including NbO$_2$/PEDT-Coated Cathodes (μF) (Invention) | Cap of Standard Wet Test Cell (μF) (Control) |
|---|---|---|---|
| 12 | 1622 | 2396 | 2291 |
| 18 | 1218 | 1627 | 1521 |
| 27 | 882  | 1087 | 981  |
| 35 | 674  | 795  | 740  |

Clearly, the capacitances of capacitors made with the inventive cathodes (coated with NbO$_2$ or NbO$_2$/PEDT) are extremely large.

Figure 3:
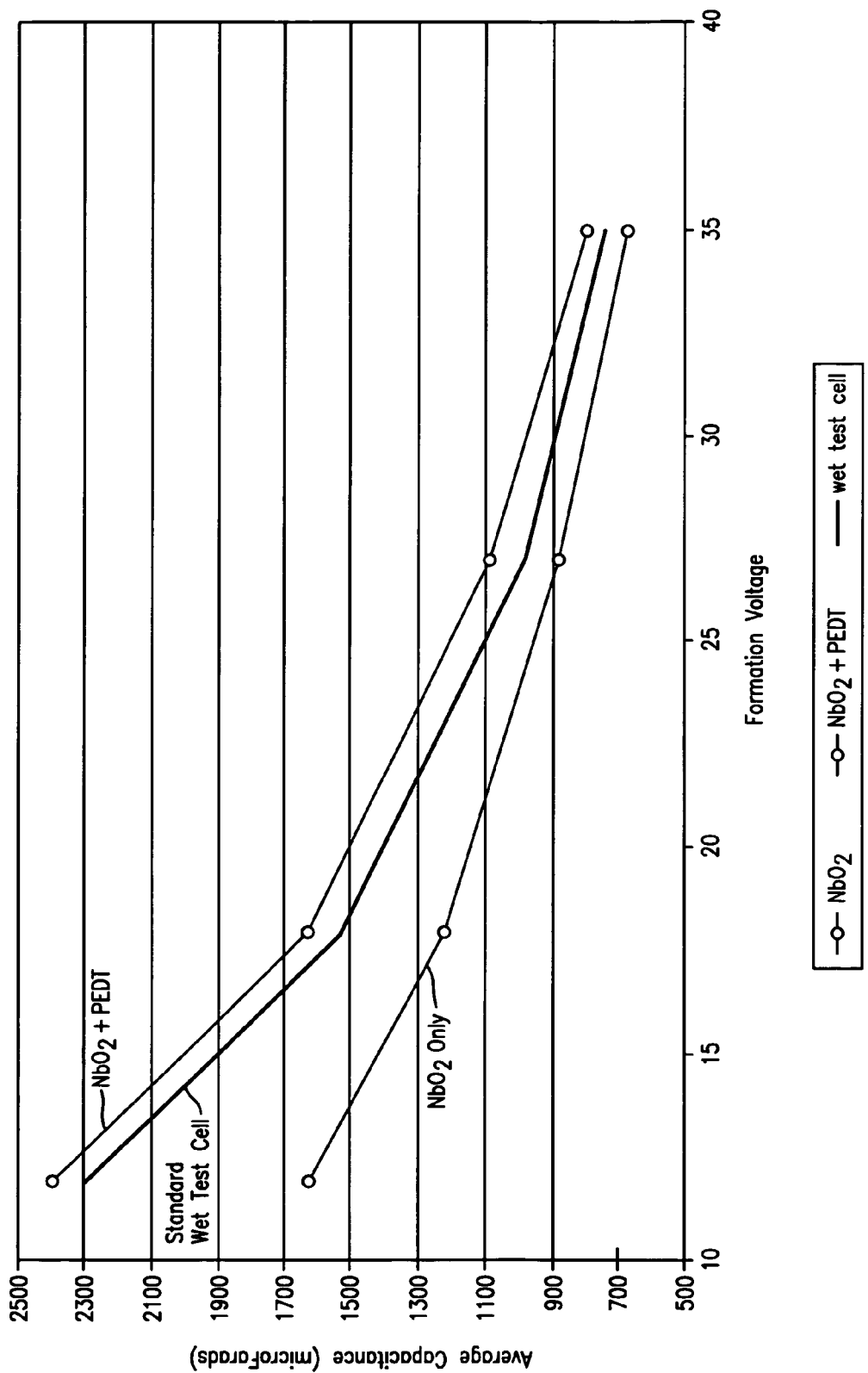
FIG. 3 is a graphical plot of the average capacitance (in µF) of several capacitors according to one embodiment of the present invention versus the formation voltage for those capacitors.

The data in Table XI just above was plotted, and the graphical plot of this data is provided as FIG. 3. The curves in FIG. 3 make clear that the capacitances measured for the capacitors containing a cathode coated with NbO$_2$ approach the capacitance of a standard wet test cell capacitor.

Additionally, the capacitance values measured for the capacitors containing a cathode coated with both NbO$_2$ and PEDT conductive polymer actually exceed the capacitance of a standard wet test cell capacitor. Such a high capacitance suggests that NbO$_2$ and conductive polymers such as PEDT work together synergistically to provide cathodes with significantly higher cathode capacitance, which is highly desirable.

Example 5

In this Example, Can #12 from Example 4 above was selected to undergo further capacitance testing. As discussed in Example 4, Can #12, a tantalum can, had been coated with both NbO$_2$ and PEDT. More specifically, Can #12 had been coated with 0.0893 grams, total weight coated, of NbO$_2$ and 0.0124 grams, total weight coated, of PEDT. As described above with respect to the dipping processes using BAYTRON C catalyst and BAYTRON M monomer, about 4 dipping cycles involving a dip into BAYTRON C solution, drying, a dip into BAYTRON M solution, and subsequent drying were required to coat the 0.0124 grams of PEDT onto the NbO$_2$-coated tantalum can. Can #12 had also been vacuum sintered at 1150° C. for 10 minutes to cause the NbO$_2$/PEDT coating to adhere to the tantalum can.

Next, progressively larger anodes were placed into Can #12 to determine the size of the cathode capacitance of Can #12. Specifically, to make such progressively larger anodes, standard production tantalum slug anodes were welded together in parallel as a larger anode was desired. The anode capacitance ($C_{anode}$) of each progressively larger anode was known.

Figure 4:
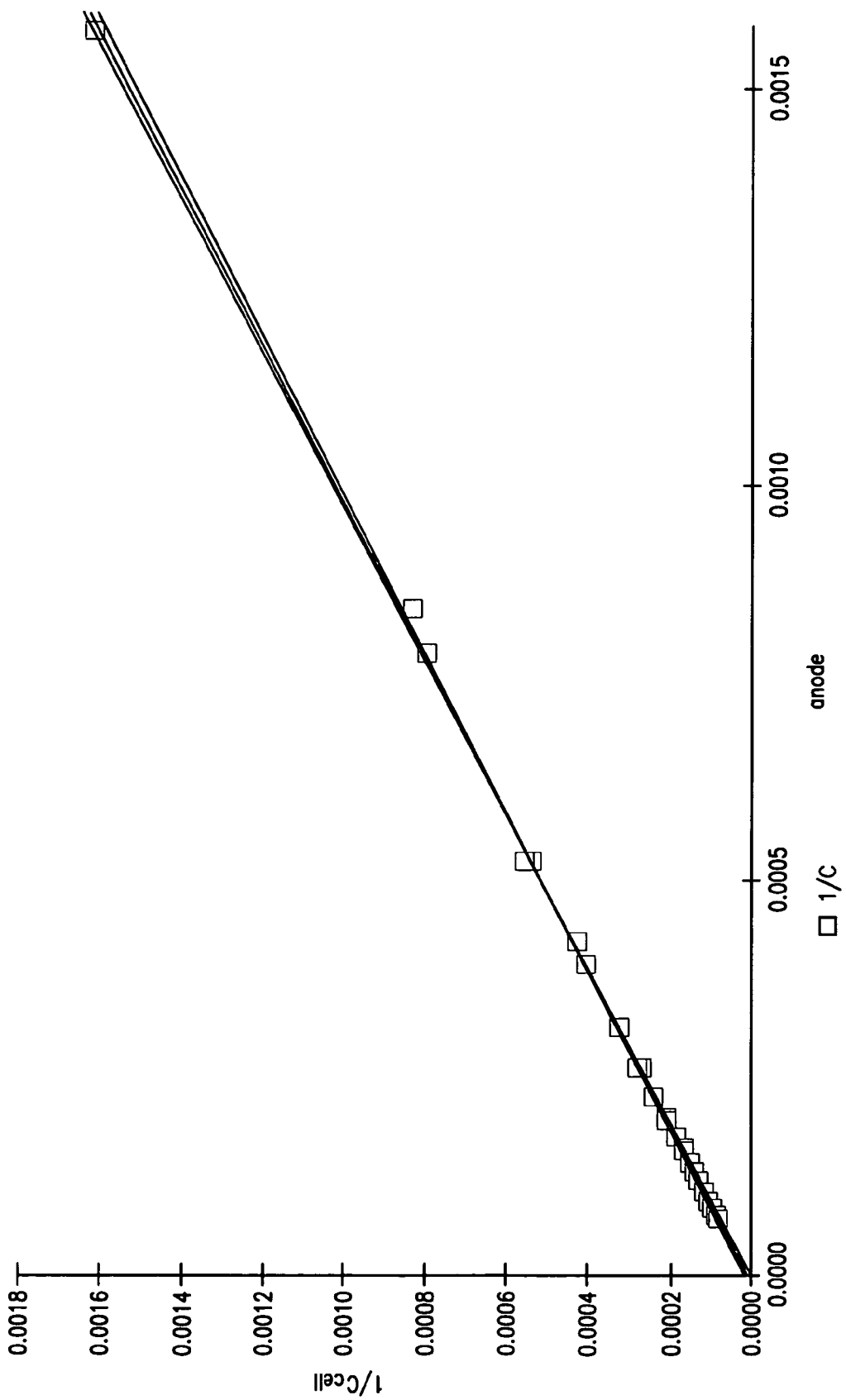
FIG. 4 is a graphical plot of the inverse of capacitance (in μF) measured for several capacitors according to one embodiment of the present invention versus the inverse of the capacitance (in μF) of progressively larger anodes used in such capacitors.

With each of the progressively larger anodes, the cell capacitance of the entire capacitor (including Can #12 as cathode and each progressively larger anode) was measured ($C_{cell}$). A plot of this data is provided as FIG. 4. Specifically, the y-axis of FIG. 4 represents the inverse of the cell capacitance measured for the entire capacitor ($1/C_{cell}$), while the x-axis of FIG. 4 represents the inverse of the known anode capacitances for each progressively larger anode tested in Can #12 ($1/C_{anode}$). The data points ($1/C_{cell}$ at certain $1/C_{anode}$ values for each larger anode) were connected with a best-fit, upwardly sloping line, shown as the middle line on FIG. 4. Additionally, ±95% confidence curves were included on FIG. 4 as the two outer lines.

The y-intercept of the curve connecting the data points included in FIG. 4 was then studied in order to obtain the cathode capacitance of Can #12 (e.g., $1/C_{cell}=1/C_{anode}+1/C_{cathode}$, so where $1/C$anode is equal to zero at the y-intercept of the plot of FIG. 4, the $1/C_{cell}$ must represent only a value for $1/C_{cathode}$). Notably, the curve connecting the data points included in FIG. 4 has a positive y-intercept.

Figure 5:
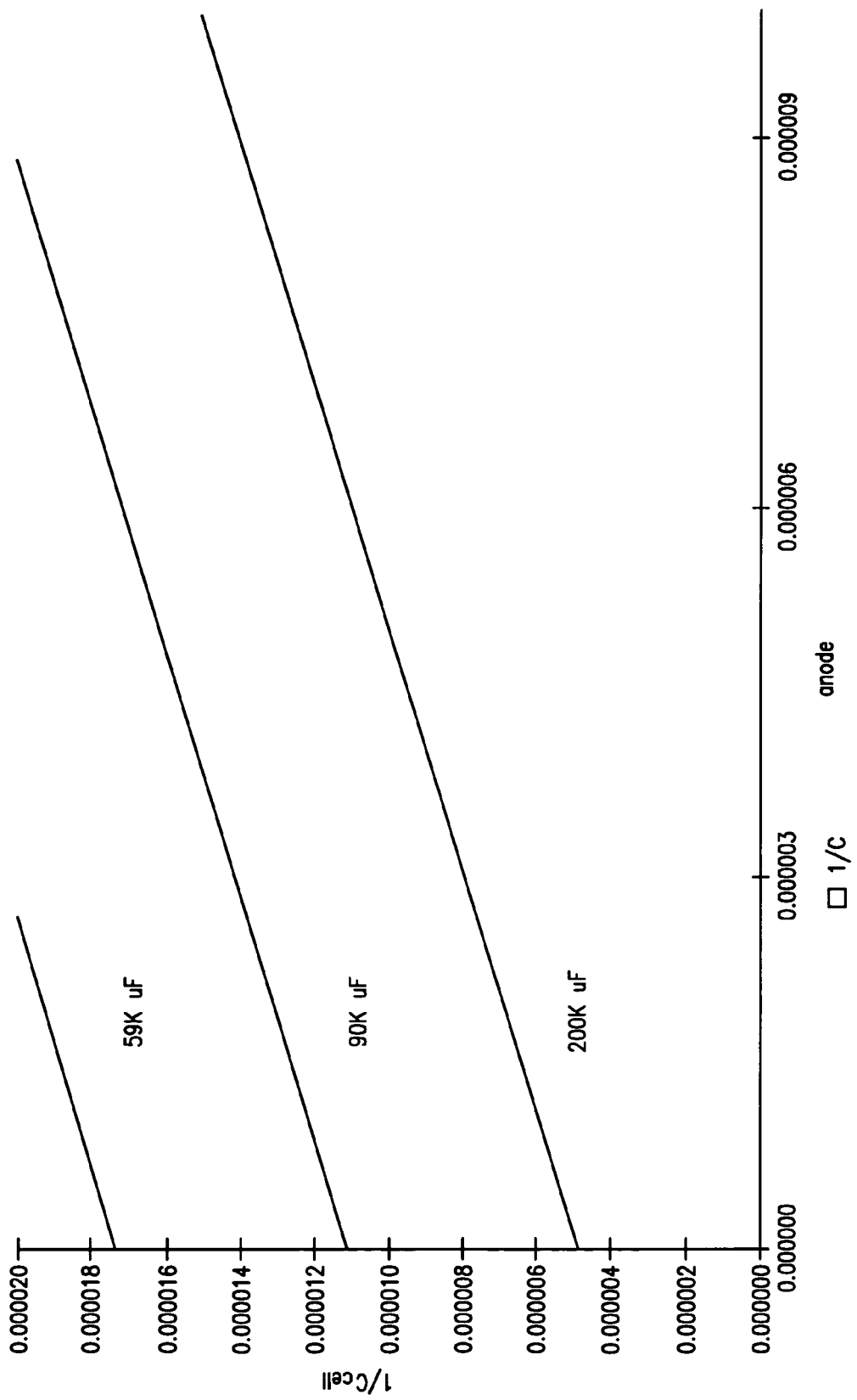
FIG. 5 is an enlarged view of the origin of the graphical plot shown in FIG. 4.

FIG. 5 provides a close-up view of the y-intercept of the plot of the data points included on FIG. 4. The y-intercept of about 0.000011 for the curve fitted to the data points (the middle line) reveals that the most probable value for the cathode capacitance of the Can #12 cathode is about 90,000 μF. Again, ±95% confidence curves were included on FIG. 5 as the two outer lines, and this provides a lower limit for the cathode capacitance of Can #12 of about 59,000 μF and an upper limit for the cathode capacitance of Can #12 of about 200,000 μF. The area of Can #12 was about 8 cm$^2$; thus, capacitance per unit area for Can #12 may be about 90,000/8 or about 11,250 μF/cm$^2$.

This high capacitance per unit area obtained for cathodes according to the present invention leads to capacitors having improved volumetric efficiency or μF*V/cc. Specifically, because of the high μF/cm$^2$ values for the cathodes made according to the present invention, a thinner cathode may be used in any given can. This means that more room in the can would remain for the anode, which facilitates using larger anodes in the same can. This translates into enabling higher capacitance anodes in a given can than would be possible if a much thicker cathode was required in the same can.

Example 6

In this Example, several capacitors were formed according to the present invention and were tested to determine their capacitance. Specifically, in these Examples, the cathode substrates used were copper foils, and these copper foils were each applied with a coating comprising NbO$_2$ and a coating comprising PEDT to make several cathodes.

The copper foil substrates in this Example were perforated with pinholes having diameters of from about 0.4 to about 3.0 mm diameter. The pinholes comprised between about 1% and about 20% of the geometric surface area of the copper foil substrates. These perforations were made in the copper foils because, in some instances, the binder used in this Example (discussed below) may experience trouble adhering to the metal substrate. In other embodiments, coupling agents might be used to aid the binder in adhering to the metal substrate, rather than physical perforations.

Several suspensions were formed in this Example, each including varying amounts of NbO$_2$ particles, varying amounts of poly vinyl difluoride (PVDF) as the binder, and N-methyl-2-pyrrolidone (NMP) as a solvent. Specifically, in this Example, the PVDF binder adheres the NbO$_2$ particles to the copper foil substrate (e.g., rather than any sort of vacuum sintering process as used in other Examples above). While PVDF was used as the binder in this Example, other suitable binders for adhering NbO$_2$ particles to a metal substrate such as a copper foil may include poly vinyl alcohol, poly ethylene glycol, poly glycol, poly tetra fluoride ethylene (PTFE), carboxymethyl cellulose, or combinations of these binders. The weight percentage of the binder in the suspension typically may be from about 1% to about 25%, depending on the specific binder used. In these Examples, the weight percentages of the PVDF binder in each NbO$_2$ suspension used to coat the copper foil substrates are listed in Table XII below.

As stated above, NMP was used as the solvent in making up the NbO$_2$ suspensions to be applied to the copper foils in this Example. However, other suitable solvents for such a process may include water, ethanol, isopropyl alcohol (IPA), acetone, di(ethylene glycol), ethyl ether acetate, or combinations of these solvents.

Table XII below describes the conditions of four cathodes that were formed according to the present invention, pointing out which binder was included in the NbO$_2$ suspensions for adhering the NbO$_2$ particles to the copper foils, pointing out the solvent used in making the NbO$_2$ suspensions, and pointing out the thickness of the resulting coating comprising NbO$_2$ and PEDT:

TABLE XII

| Copper Foil Cathode # | Binder | Binder Wt. % in Suspension | Solvent | NbO$_2$ Wt. % in Suspension | Thickness of NbO$_2$/PEDT Coating (μm) |
|---|---|---|---|---|---|
| 1 | PVDF | 5.6 | NMP | 50.8 | ~100 |
| 2 | PVDF | 8.7 | NMP | 49.2 | ~100 |
| 3 | PVDF | 11.9 | NMP | 47.5 | ~100 |
| 4 | PVDF | 7.1 | NMP | 40.3 | ~100 |

In addition to the ingredients contained in the NbO$_2$ suspension (e.g., binder, solvent, NbO$_2$ particles) for forming the NbO$_2$ coating on Copper Foil Cathode #4 in Table XII above, a very small amount of a conductive material, specifically graphite, was included in the NbO$_2$ suspension, and the graphite comprised less than about 1 weight % of the suspension used to coat Copper Foil Cathode #4 with a coating comprising NbO$_2$.

It should be noted that in this Example, the coating comprising NbO$_2$ was first applied to each copper foil and dried, and then a coating comprising PEDT was formed on the NbO$_2$-coated copper metal substrates. The PEDT coating was formed by first dipping the NbO$_2$-coated copper substrates into a monomer solution comprising BAYTRON M, subsequently drying the substrates, and then dipping the substrates into a catalyst solution comprising BAYTRON C.

Capacitors were formed using each of the above-described coated copper foil cathodes and an anode. Specifically, in this Example, the anode was a slug of NbO anodized at 25 Volts and weighing 0.39 grams. The liquid electrolyte in each capacitor formed in this Example was a 5.0 M solution of H$_2$SO$_4$.

Each of the above-described copper-based cathodes had a coated surface area (copper foil+both sides coated with NbO$_2$/PEDT) of about 4.0 cm$^2$. The anode-to-cathode distance in each of these capacitors was about 0.5 cm. The cell capacitance values of these capacitors were measured using an Agilent 4284A Precision LCR meter with Agilent 16089B Kelvin Leads with 10.0 volts bias and 1 volt signal at 120 Hertz. These capacitance values are reported in Table XIII below:

TABLE XIII

| Capacitor Made From Copper Foil Cathode # | Cell Capacitance (μF) |
|---|---|
| 1 | 1750 |
| 2 | 1760 |
| 3 | 1760 |
| 4 | 1600 |

After obtaining the cell capacitance values listed above in Table XIII, an estimate of the cathode capacitance of Copper Foil Cathode #1 was made using the equation $1/C_{cell}=1/C_{cathode}+1/C_{anode}$. Specifically, the NbO powder used to form the anode in this Example, commercially available from H. C. Starck, was supplied with a given μF*V/g value of 120,000. Solving for the capacitance of the cathode, it appeared that the capacitance of Copper Foil Cathode #1 was more than 26,000 μF. Thus, the copper foil cathodes in this Example, coated with NbO$_2$ and PEDT according to the present invention, proved to perform very well as cathodes for wet electrolytic capacitors.

Comparative Example

In this Comparative Example, experiments were performed to determine the capacitance of capacitors formed using cathodes containing only tantalum coupons or foils coated with the conductive polymer PEDT (e.g., cathodes without a coating of a metal oxide, such as niobium dioxide). Specifically, in this Comparative Example, several cathodes were formed solely by providing tantalum coupons and coating the tantalum coupons with varying amounts of PEDT ranging from 0 grams to about 0.0012 grams of PEDT. Capacitors were formed using each of the PEDT-coated cathodes and a standard anode, and cell capacitance of each capacitor, in μF, was measured and recorded.

Figure 6:
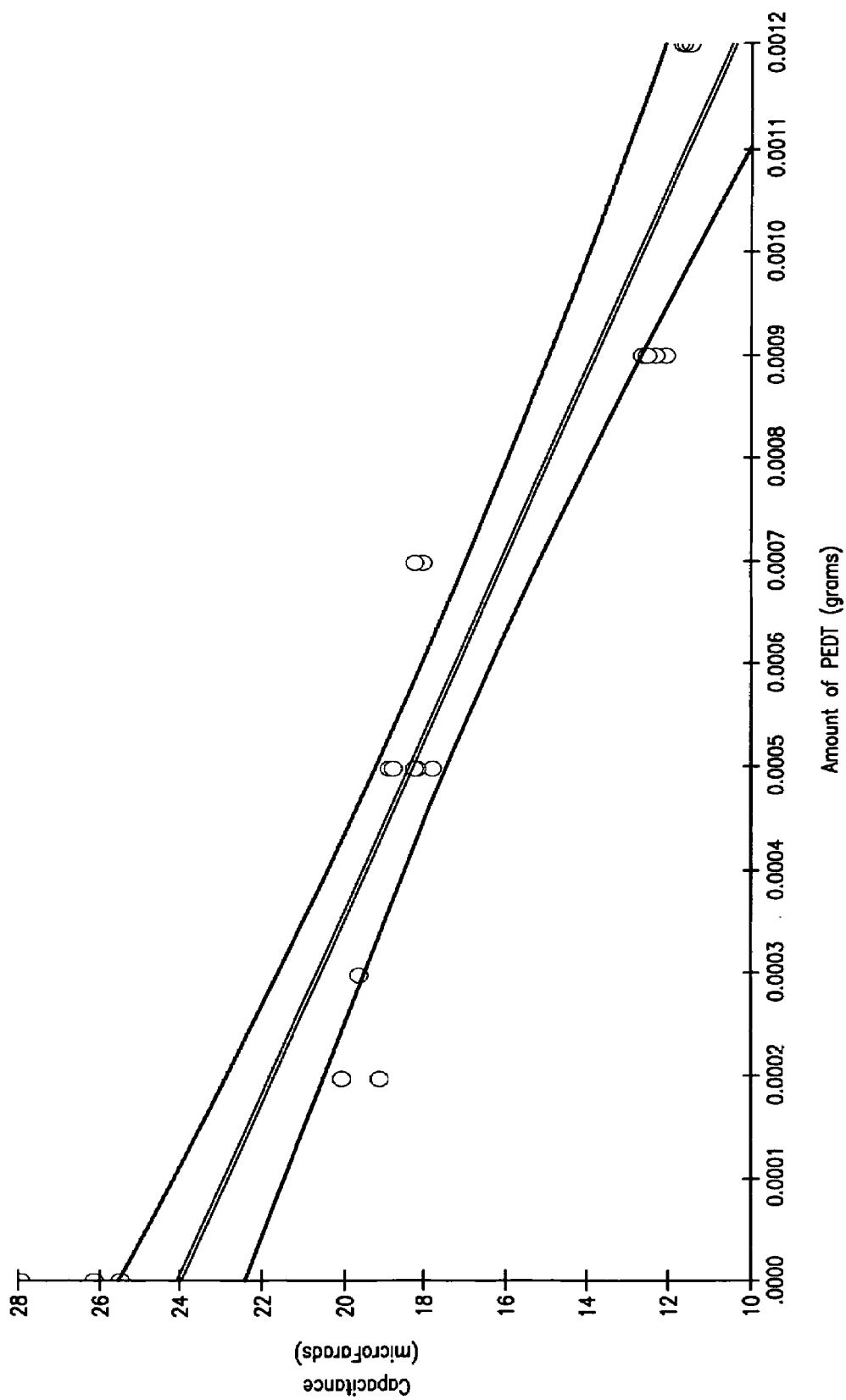
FIG. 6 is a graphical plot of cathode capacitance (in μF) versus the amount of conductive polymer (in grams) for cathodes according to the prior art.

FIG. 6 shows a graph of the results of this Comparative Example. Specifically, FIG. 6 graphs cell capacitance in μF versus the amount of PEDT used as a coating for each tantalum foil cathode, in grams. FIG. 6 illustrates that when a capacitor is formed using a cathode that contains only a basic tantalum substrate (e.g., without any metal oxide coating, such as a coating of NbO$_2$) that is coated with a conductive polymer such as PEDT, the cell capacitance actually decreases as the amount of PEDT used to coat the tantalum substrate is increased.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A method for forming a wet electrolytic capacitor, the method comprising:
   anodizing a surface of an anode to form a dielectric film;
   applying a particle suspension to a metal substrate of a cathode;
   sintering the suspension to form an oxide coating, the oxide coating comprising a niobium oxide having an atomic ratio of niobium to oxygen of 1:less than 2.5; and
   disposing a liquid electrolyte between the anode and the cathode.

2. The method of claim 1, wherein the suspension comprises a niobium oxide having an atomic ratio of niobium to oxygen of 1:less than 1.5.

3. The method of claim 1, wherein the suspension comprises Nb$_2$.

4. The method of claim 1, wherein the suspension comprises Nb$_2$O$_5$.

5. The method of claim 1, wherein the suspension has a solids content of from about 20% to about 80% by weight.

6. The method of claim 1, wherein the metal substrate is dipped into the suspension.

7. The method of claim 1, wherein the oxide coating is formed from multiple layers of the suspension.

8. The method of claim 7, wherein each of the layers has a thickness of less than about 150 μm.

9. The method of claim 1, wherein the suspension is sintered at a temperature of from about 800° C. to about 1400° C.

10. The method of claim 1, further comprising applying a conductive polymer coating, a protective coating, or both over the oxide coating.

11. The method of claim 1, wherein the liquid electrolyte is an aqueous solution of sulfuric acid.

12. The method of claim 1, wherein the suspension comprises $NbO_{0.7}$, $NbO_{1.0}$, $NbO_{1.1}$, $NbO_2$, or a combination thereof.

13. The method of claim 1, wherein the suspension comprises a niobium oxide having an atomic ratio of niobium to oxygen of 1:0.5±0.2.

14. The method of claim 1, wherein the metal substrate comprises a metal selected from the group consisting of tantalum, niobium, aluminum, hafnium, titanium, and combinations thereof.

15. The method of claim 1, wherein the anode comprises tantalum, niobium, electrically conductive oxides or nitrides thereof, or combinations of the foregoing.

16. The method of claim 1, wherein the oxide coating has a resisitivity of less than about $1 \times 10^5$ ohm-cm.

17. The method of claim 1, further comprising drying the suspension at a temperature of from about 500° C. to about 150° C.

18. The method of claim 1, wherein the suspension is sintered at a temperature of from about 600° C. to about 2000° C.

19. A method for forming a wet electrolytic capacitor containing an anode and a cathode, the method comprising:
  applying a particle suspension to a metal substrate of the cathode;
  sintering the suspension at a temperature of from about 800° C. to about 1400° C. to form an oxide coating, the oxide coating comprising a niobium oxide having an atomic ratio of niobium to oxygen of 1:less than 1.5; and
  disposing a liquid electrolyte between the anode and the cathode.

20. The method of claim 19, wherein the suspension comprises a niobium oxide having an atomic ratio of niobium to oxygen of 1:0.5±0.2.

* * * * *

UNITED STATES PATENT AND TRADEMARK OFFICE
CERTIFICATE OF CORRECTION

PATENT NO.           : 7,456,073 B2                                         Page 1 of 1
APPLICATION NO.  : 11/510966
DATED                    : November 25, 2008
INVENTOR(S)          : James A. Fife, Gang Ning and Brady Jones It is certified that error appears in the above-identified patent and that said Letters Patent is hereby corrected as shown below:

Col. 24, claim 17 line 2 "...temperature of from about 500° C. to about 150° C." should read --...temperature of from about 50° C. to about 150° C.--

Signed and Sealed this

Tenth Day of February, 2009

JOHN DOLL
*Acting Director of the United States Patent and Trademark Office*

UNITED STATES PATENT AND TRADEMARK OFFICE
CERTIFICATE OF CORRECTION

PATENT NO.         : 7,456,073 B2                                        Page 1 of 1
APPLICATION NO. : 11/510966
DATED              : November 25, 2008
INVENTOR(S)        : James A. Fife, Gang Ning and Brady Jones It is certified that error appears in the above-identified patent and that said Letters Patent is hereby corrected as shown below:

Col. 24, claim 17 line 4 "...temperature of from about 500° C. to about 150° C." should read --...temperature of from about 50° C. to about 150° C.--

This certificate supersedes the Certificate of Correction issued February 10, 2009.

Signed and Sealed this

Tenth Day of March, 2009

JOHN DOLL
*Acting Director of the United States Patent and Trademark Office*